United States Patent

Shirakura et al.

[11] Patent Number: 6,018,403
[45] Date of Patent: Jan. 25, 2000

[54] IMAGE REPRODUCING METHOD AND APPARATUS

[75] Inventors: Akira Shirakura; Nobuhiro Kihara; Shigeyuki Baba, all of Tokyo, Japan

[73] Assignee: Sony Corporation, Japan

[21] Appl. No.: 09/037,684

[22] Filed: Mar. 10, 1998

[30] Foreign Application Priority Data

Mar. 11, 1997 [JP] Japan ................................. 9-056540

[51] Int. Cl.[7] ............................................. G02H 1/26
[52] U.S. Cl. ............................................. 359/23; 359/32
[58] Field of Search ................... 359/8, 23, 15, 359/32

[56] References Cited

U.S. PATENT DOCUMENTS

| 4,390,234 | 6/1983 | Embach ................. | 350/3.65 |
| 4,807,971 | 2/1989 | Nurano .................. | 359/32 |
| 4,834,476 | 5/1989 | Benton .................. | 350/3.76 |
| 5,016,950 | 5/1991 | Smith ................... | 359/15 |
| 5,121,229 | 6/1992 | Benton et al. .......... | 359/32 |

FOREIGN PATENT DOCUMENTS 0 814 387 A2  12/1997  European Pat. Off. .

*Primary Examiner*—Cassandra Spyrou
*Assistant Examiner*—Craig Curtis
*Attorney, Agent, or Firm*—Rader, Fishman & Grauer; Ronald P. Kananen

[57] ABSTRACT

An image reproducing method and apparatus whereby an image with a wide angle of visibility can be reproduced from a holographic stereogram in a manner less susceptible to blurring. For reproducing an image from a holographic stereogram 80 of an edge lit system, a holographic stereogram 80 is arranged on a lateral side of a cylindrically-shaped light-introducing block 81 and a reproducing illuminating light beam 82 is illuminated on the holographic stereogram 80 via the light-introducing block 81. A reproduced image 85 is produced by a diffracted light beam obtained on diffraction of the reproducing illuminating light beam 82 transmitted through the holographic stereogram 80.

17 Claims, 20 Drawing Sheets

IMAGE REPRODUCING METHOD AND APPARATUS

BACKGROUND OF THE INVENTION

1. Field of the Invention

This invention relates to an image reproducing method and apparatus for reproducing an image from a holographic stereogram the edge-trigger system.

2. Description of Related Art

A holographic stereogram is prepared by sequentially recording strip- or dot-shaped elementary holograms (hologram elements) on a sole recording medium for hologram from an original image comprised of a large number of images obtained on sequentially photographing an object from different viewing points.

For example, in a holographic stereogram having the parallax information only in the transverse direction, plural original images 110a to 101e, obtained on sequentially photographing an object 100 from different transverse viewing points are sequentially recorded on a recording medium for hologram 102 as strip-shaped hologram elements, as shown in FIG. 1.

In this holographic stereogram, the image information obtained from sequentially photographing from different transverse viewing points is sequentially recorded in the transverse direction as strip-shaped hologram elements, so that, if this holographic stereogram is viewed by an observer with his or her both eyes, the two-dimensional images as viewed by the left and right eyes differ slightly from each other. Thus, the viewer sees parallax, so that a three-dimensional image is reproduced.

Meanwhile, in a usual hologram, an illuminating light source for reproducing a three-dimensional image is spatially removed from a hologram. Therefore, a usual hologram is in need of a broad spacing for reproduction. Also, for reproduction under optimum conditions, the relative position between the hologram and the illuminating light source needs to be set to pre-set conditions. This applies for a holographic stereogram composed of plural hologram elements.

On the other hand, if an illuminating light source is integrated with a hologram, no spacing for illumination is required to save spacing. Moreover, since the relative position between the hologram and the illuminating light source is always fixed, reproduction can be performed at all times under optimum conditions. For realising this configuration, attention is directed to an edge-trigger hologram in which a recording medium is stuck to a transparent light-introducing block in order to effect recording/reproduction.

If a transmission hologram, in which a three-dimensional image is reproduced by the light transmitted through a recording medium, is to be produced in accordance with the edge-lit system, a recording medium for hologram 111 is bonded to a surface 110a of a light-introducing block 110 of a suitable thickness formed of a transparent material, such as glass or plastics, as shown in FIG. 2. In this case, the recording medium 111 is usually bonded to the light-introducing block 110 via an index matching liquid 112, in order to prevent total light reflection. An object light beam 114 from an object 113 is illuminated from the opposite surface 110b of the light-introducing block 110 towards the recording medium 111, at the same time as a reference light beam is illuminated from an end face 110c of the light-introducing block 110 towards the recording medium 111. This produces a transmission type edge-lit hologram.

In reproducing the transmission type edge-lit hologram, thus produced, a hologram 121 is bonded via an index matching liquid 122 on a surface 120a of a light-introducing block 120, and an illuminating light beam 123 is illuminated from an end face 120b of the light-introducing block 120 towards the hologram 121. The light beam transmitted through the hologram 121 is diffracted by the hologram 121 to generate a diffracted light beam 124 to generate a reproduced image 125 which is viewed by an observer 126. In preparing a reflection type hologram, in which a three-dimensional image is reproduced by the light beam reflected by the recording medium, a recording medium 132 is bonded via an index matching liquid 131 on a surface 130a of a light-introducing block 130, as shown in FIG. 4. In the case of the reflection type edge-lit hologram, an object light beam 134 from an object 133 is illuminated to the recording medium 132 from the recording medium sticking side, at the same time as a reference light beam 135 is illuminated towards the recording medium 132 from the end face 130b of the light-introducing block 130. This completes a reflection edge-lit hologram.

In reproducing the reflection type edge-lit hologram, thus produced, a hologram 141 is bonded via an index matching liquid 142 on a surface 140a of a light-introducing block 140, and an illuminating light beam 143 is illuminated from an end face 140b of the light-introducing block 140 towards the hologram 141. The light beam reflected by the hologram 141 is diffracted by the hologram 141 to give a diffracted light beam 144. This diffracted light beam 144 generates a reproduced image 145 which is viewed by an observer 146.

With this edge-lit hologram, a reproducing optical system can be reduced in size by integrating the light source for the reproducing illuminating light beam and the light-introducing block. Moreover, reproduction can be carried out at all times under optimum conditions. In addition, with the edge-lit hologram, since the angle of incidence of the reproducing illuminating light beam is increased, there is no risk of an image being reproduced by extraneous incident light. Thus, the edge-lit hologram is finding application in a field in which image reproduction by light, such as sunbeam is not desired, as in the case of a headup display device.

The edge-lit hologram has many advantages, as described above. The present inventors made attempts to apply the edge-lit system to the holographic stereogram. When applying the edge-lit system to the holographic stereogram, it suffices if each hologram element is recorded/reproduced by the edge lit system. The basic principle is the same as that for a usual hologram.

However, if the holographic stereogram of the edge lit system is bonded to the light-introducing block as shown in FIGS. 3 or 5 for image reproduction, the angle of visibility is limited significantly, such that it becomes impossible to reproduce an area lying directly at the back of an object. That is, the holographic stereogram of the edge lit system suffers from a drawback that the angle of visibility is limited significantly.

As for a hologram of directly illuminating the illuminating reproducing light, which is not an edge lit system, there is such a hologram called a multiplex cylindrical hologram in which the area directly at back of the object can be reproduced. In the multiplex cylindrical hologram, a hologram is rounded into a cylinder and the reproducing illuminating light beam is illuminated from the inside of the cylinder for reproducing an image. This multiplex cylindrical hologram has an advantage that a reproduced image looks as if it were confined at the center of the cylinder, thus manifesting excellent display effects.

However, in the multiplex cylindrical hologram, the illuminating angle of the reproducing illuminating light cannot be made an acute angle, such that a light source needs to be arranged inside the cylindrically rounded hologram, thus increasing the size of the image reproducing device. Moreover, with the multiplex cylindrical hologram, the diameter of the cylinder formed by rounding the hologram needs to be larger because a light source needs to be arranged within the cylindrically rounded hologram. However, if the cylindrical hologram is increased in diameter, the hologram surface is markedly separated from the position of the reproduced image thus inevitably blurring a reproduced image.

SUMMARY OF THE INVENTION

It is therefore an object of the present invention to provide a method for reproducing an image from a holographic stereogram in which the image is blurred to a lesser extent and in which a wide angle of visibility is realized.

It is another object of the present invention to provide an apparatus for reproducing an image from a holographic stereogram in which the image is blurred to a lesser extent and a wide angle of visibility is realized while the device may be reduced in size.

In an image reproducing method for reproducing an image from a holographic stereogram of the edge-lit system, according to the present invention, a holographic stereogram is arranged on a curved surface of a light-introducing block, a reproducing illuminating light beam is illuminated on the holographic stereogram via the light-introducing block and an image with a diffracted light beam produced when the reproducing illuminating light beam is transmitted through the holographic stereogram.

In an image reproducing apparatus for reproducing an image from a holographic stereogram of the edge-lit system, according to the present invention, there is provided a light-introducing block having a curved surface on which is arranged a holographic stereogram. A reproducing illuminating light beam is illuminated via a light-introducing block to a holographic stereogram arranged on the curved surface of the light-introducing block via the light-introducing block, so that an image is reproduced by the reproducing illuminating light beam transmitted through and diffracted by the holographic stereogram.

With the present image reproducing method and apparatus according to the present invention, a holographic stereogram is arranged on the curved surface of the light-introducing block and the reproducing illuminating light beam is illuminated on the holographic stereogram via the light-introducing block, thus realizing an image having a wide angle of visibility. According to the present invention, the angle of visibility can be enlarged to the total circumference of 360° such that there is produced a display effect as if a three-dimensional image is confined inside a small-sized cylinder.

Moreover, according to the present invention, employing the light-introducing block, the angle of illumination of the reproducing illuminating light beam can be made an acute angle. Since the hologram surface can be provided at a proximate position to the reproduced image, an image susceptible to less blurring can be reproduced.

Also, according to the present invention, in which a reproducing illuminating light beam is illuminated via a light-introducing block on the holographic stereogram arranged on the curved surface of the light-introducing block, and an image is reproduced by the diffracted light beam obtained when the reproducing illuminating light beam is transmitted through and diffracted by the holographic stereogram, a three-dimensional image can be reproduced which has an extremely wide angle of visibility and superior display effect.

In addition, since the holographic stereogram of the present invention is of the edge-lit system, the holographic stereogram can be reduced in diameter as compared to the multiplex cylindrical hologram, thus enabling shortening the distance between the hologram surface and the reproduced image. Thus, according to the present invention, an image less susceptible to blurring is reproduced, while the image reproducing device can be reduced in size.

DESCRIPTION OF PREFERRED EMBODIMENTS

Figure 1:
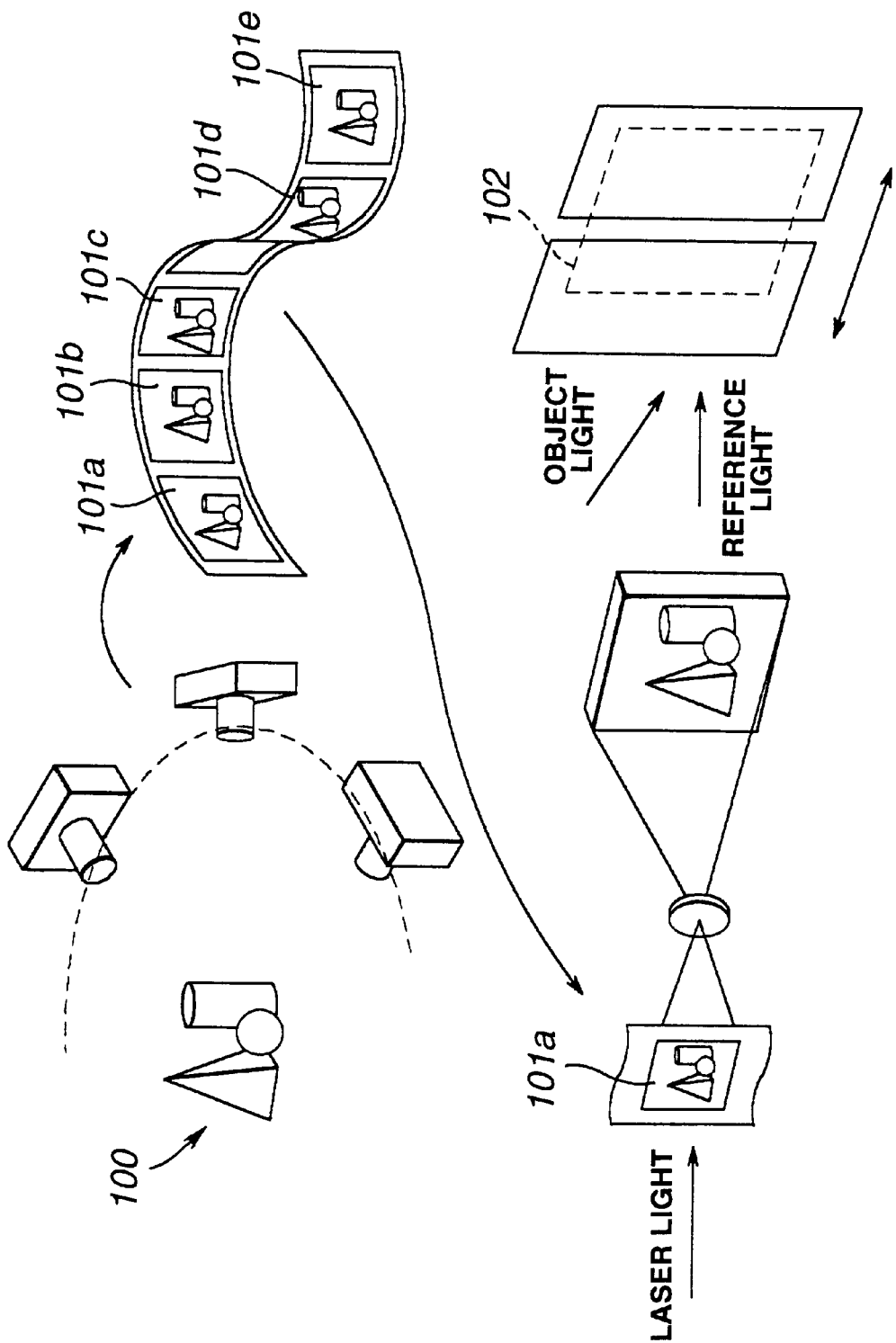
FIG. 1 is a schematic view for illustrating a method for producing a holographic stereogram.
Figure 2:
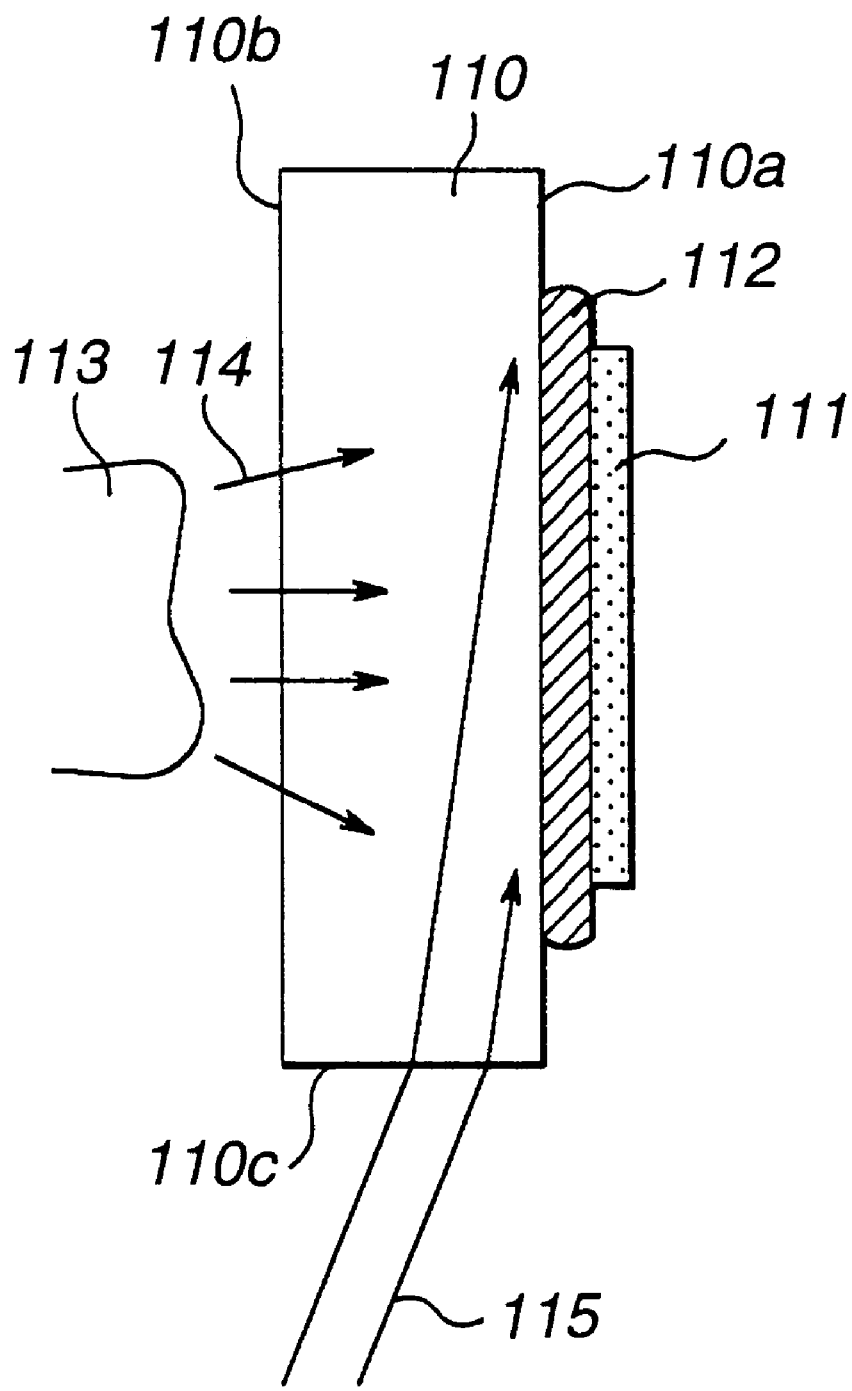
FIG. 2 is a schematic view for illustrating a method for producing a transmission type edge-lit hologram.
Figure 3:
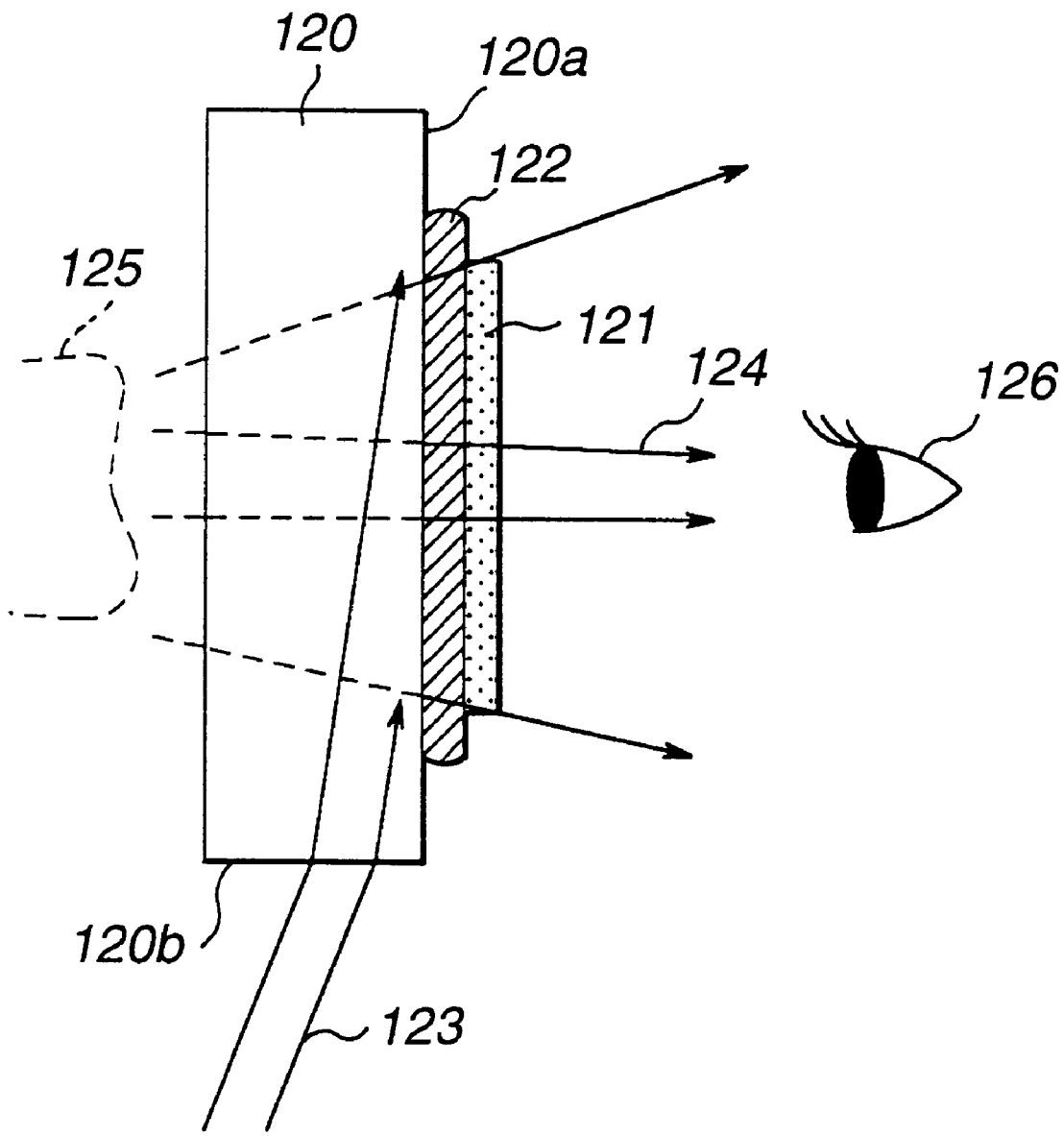
FIG. 3 is a schematic view for illustrating a method for reproducing a conventional transmission type edge-lit hologram.
Figure 4:
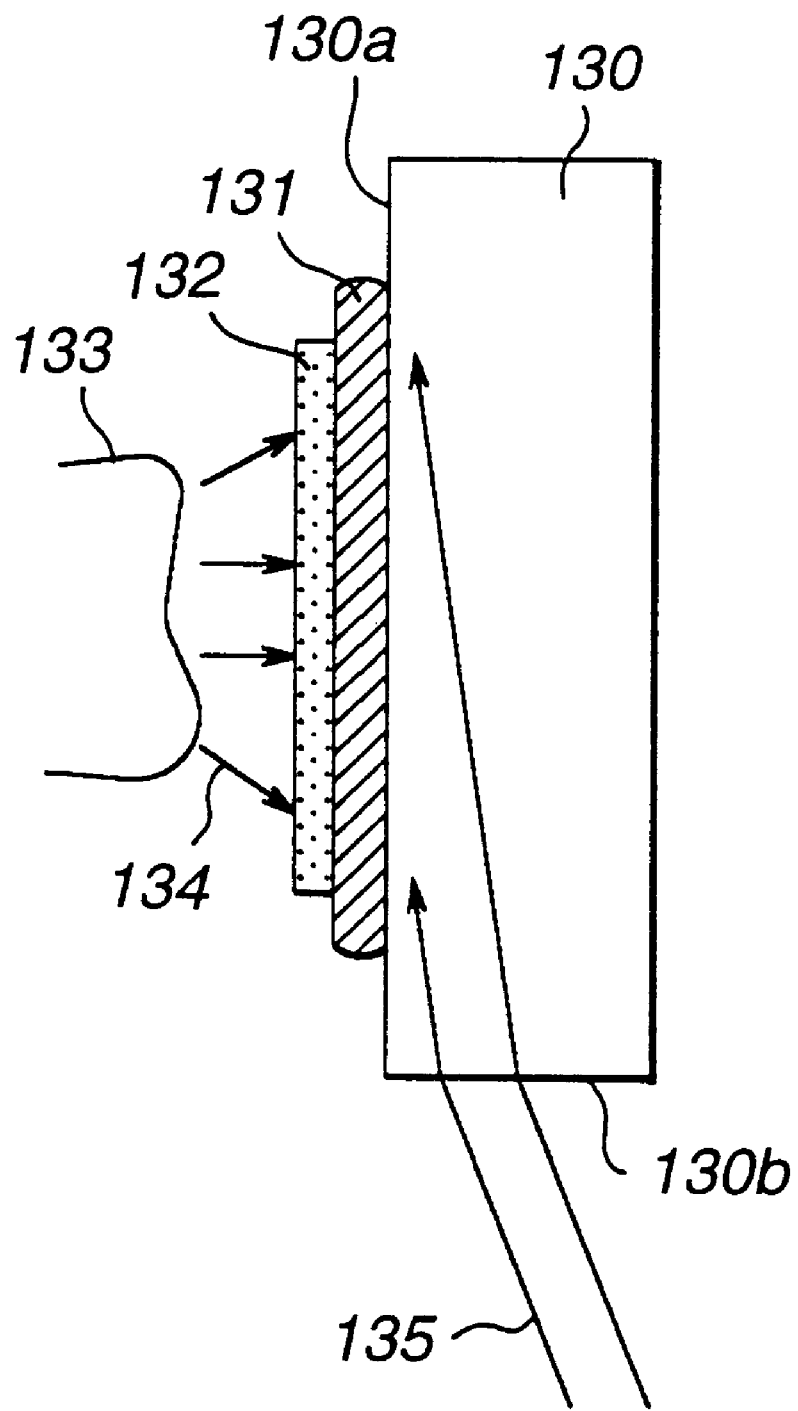
FIG. 4 is a schematic view for illustrating a method for producing a reflection type edge-lit hologram.
Figure 5:
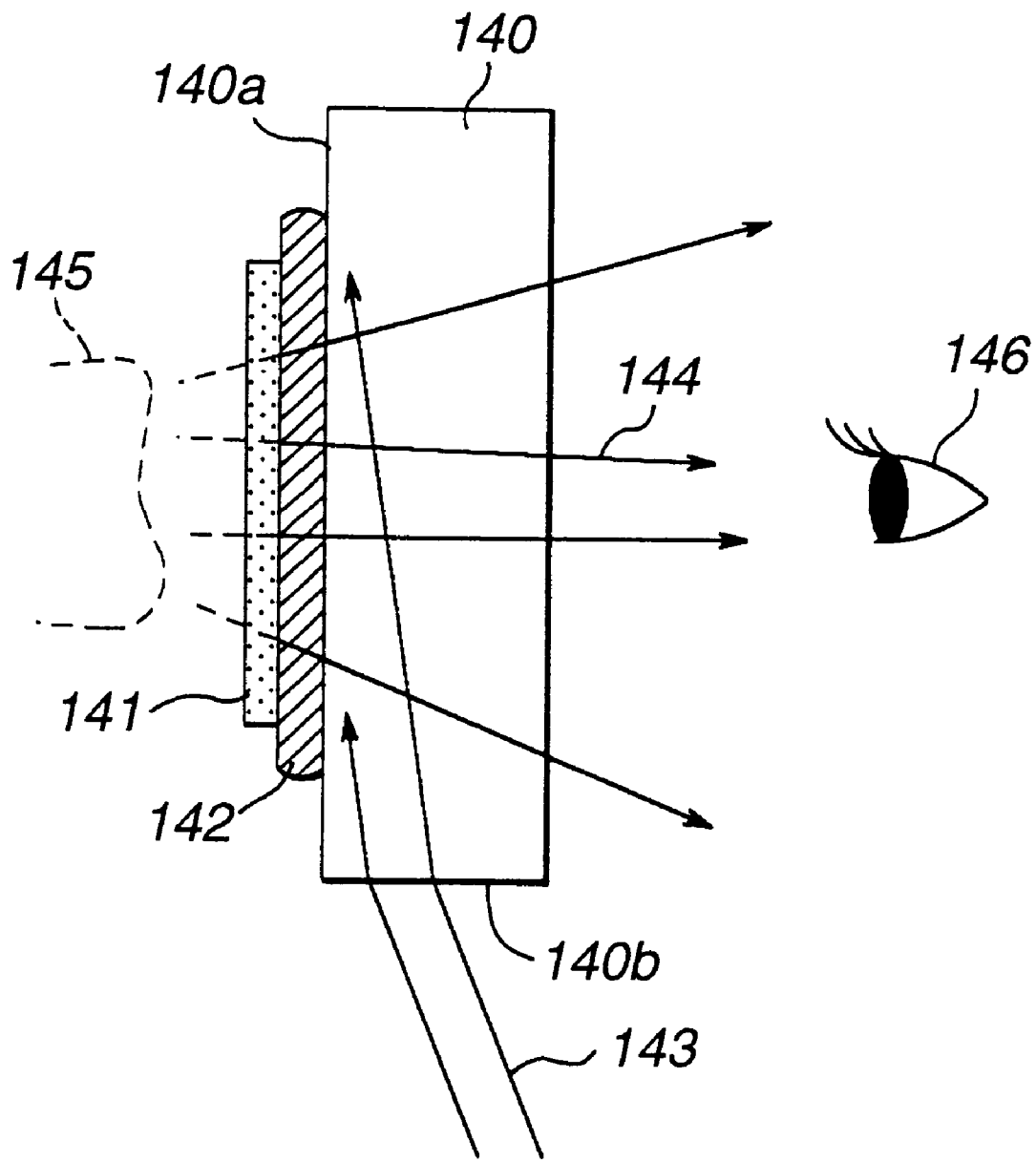
FIG. 5 is a schematic view for illustrating a method for reproducing a conventional reflection type edge-lit hologram.

Referring to the drawings, preferred embodiments of the present invention will be explained in detail.

First, an illustrative structure of a holographic stereogram producing system for preparing a holographic stereogram to be reproduced is explained. The following description is directed to a holographic stereogram in which plural strip-shaped hologram elements are recorded on a sole recording medium for providing the parallax information in the transverse direction. However, the present invention can, of course, be applied to such a holographic stereogram in which plural dot-shaped hologram elements are recorded on a sole recording medium for providing the parallax information in both the transverse and longitudinal directions.

Figure 6:
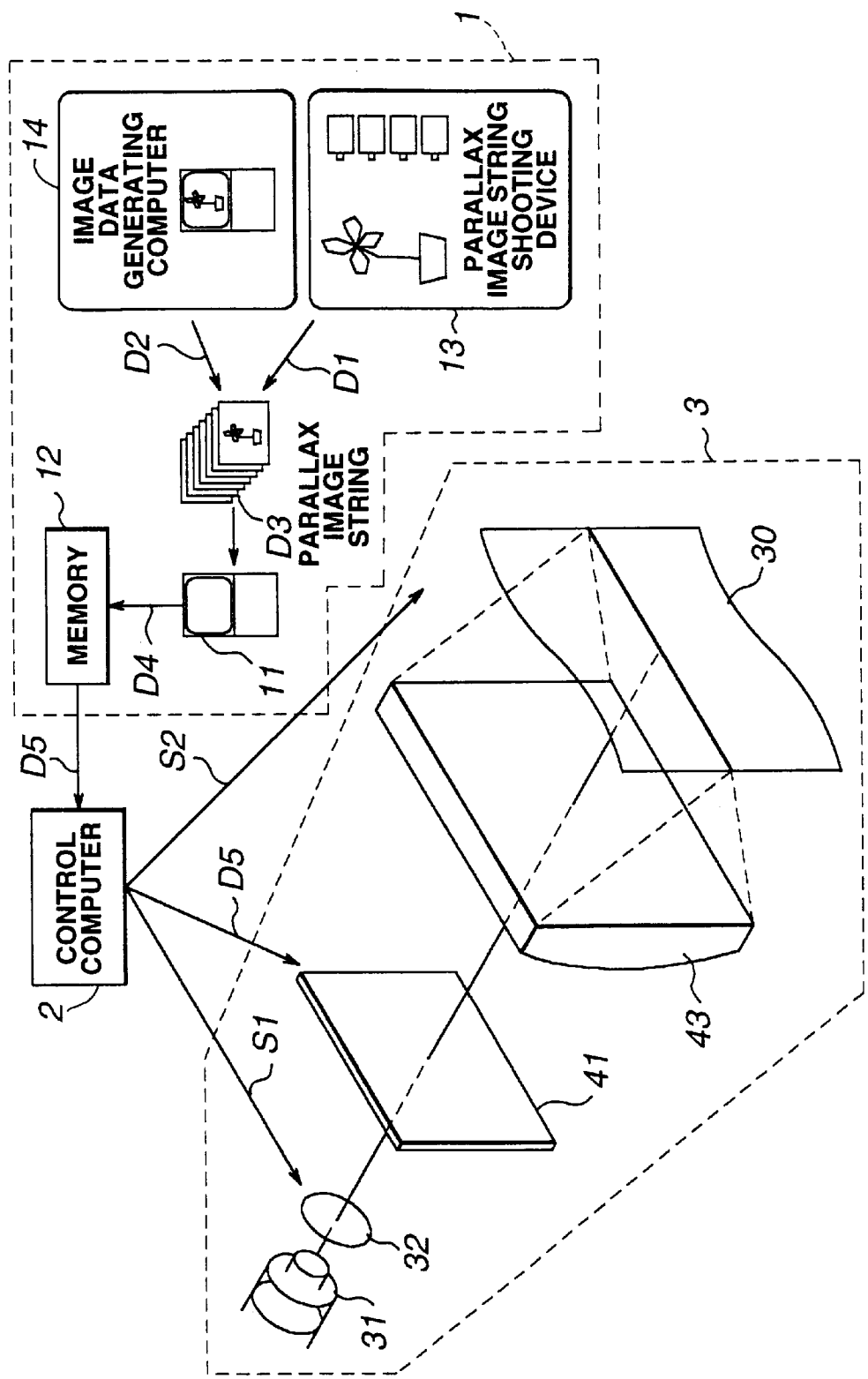
FIG. 6 is a schematic view showing an illustrative structure of a system for preparation of a holographic stereogram.

This holographic stereogram preparing system is such a system in which a so-called one-step holographic stereogram is formulated in accordance with an edge lit system. The one-step holographic stereogram, which is a recording medium for a hologram on which are recorded interference fringes of the object light and the reference light, is made up of a data processing unit 1 for processing image data to be recorded, a control computer 2 for controlling the entire system and a holographic stereogram printer device 3 having an optical system for preparing the holographic stereogram, as shown in FIG. 6.

The data processing unit 1 formulates a parallax image string D3 based on plural image data D1 including the parallax information supplied from a multiple-lens camera or a moving type camera, and plural image data D2 including the parallax information generated by an image data generating computer 14.

Plural image data Data processing unit 1, inclusive of the parallax information supplied from parallax image string imager 13, are image data for several images obtained on photographing an object from plural different transverse viewing points by simultaneous photographing by a multi-lens camera or by continuous photographing by a moving camera.

On the other hand, plural image data D2, inclusive of the parallax information generated by an image data generating computer 14, are image data of plural CAD (computer-aided design) images or CG (computer graphics) images, formulated by sequentially providing the parallax in the transverse direction.

The data processing unit 1 performs pre-set image processing for a holographic stereogram on the parallax image string D3 by an image processing computer 11. The image data D4, processed with pre-set image processing, is recorded on a recording device 12, such as a memory or a hard disc.

For recording an image on a recording medium for a hologram, the data processing unit 1 sequentially reads out data from image data D4 recorded by the recording device 12, from one image to another, and sends out read-out image data D5 to the control computer 2.

On the other hand, the control computer 2 drives the holographic stereogram printer device 3 for sequentially recording an image corresponding to the image data D5 supplied from the data processing unit 1 as strip-shaped hologram elements on a recording medium for hologram 30 set on the holographic stereogram printer device 3.

The control computer 2 at this time controls a shutter 32, a display unit 41 and a recording medium feed unit, provided on the holographic stereogram printer device 3, as will be explained subsequently. That is, the control computer 2 sends out a control signal S1 to a shutter 32 to control the opening/closure of the shutter 32. The control computer 2 also sends image data D5 to the display unit 41 to display an image corresponding to the image data D5 on the display unit 41, while sending a control signal S2 to a recording medium feed unit to control the feed operation of the recording medium for hologram 30 carried out by the recording medium feed unit.

Figure 7:
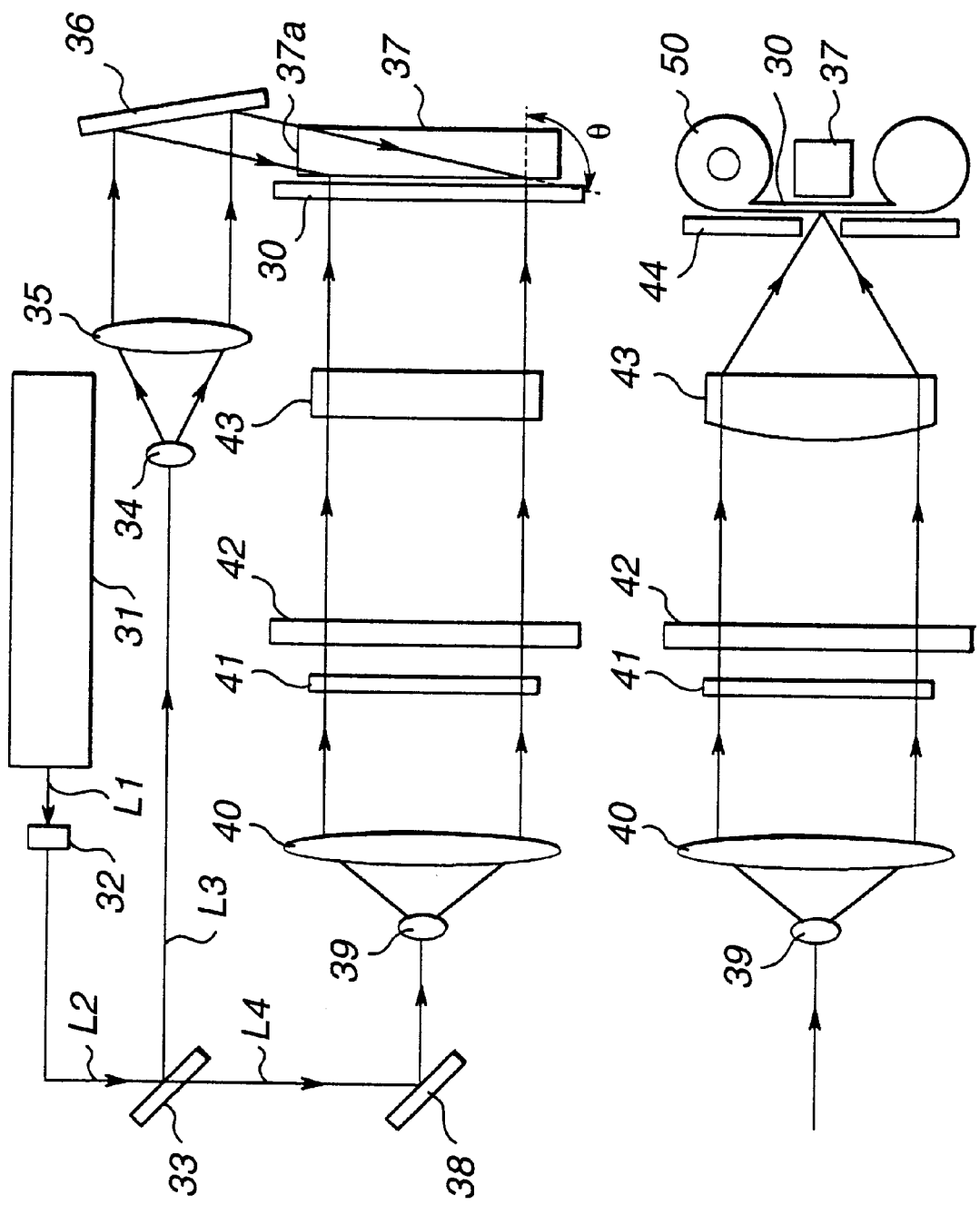
FIG. 7 consisting of FIGS. 7A through 7B is a schematic view for illustrating a typical optical system of a holographic stereogram printer device.

Referring to FIG. 7, the holographic stereogram printer device 3 is explained in detail. FIG. 7A is a view looking from above the optical system of the entire holographic stereogram printer device 3, whilst FIG. 7B is a view looking from the lateral side of an object light portion of the optical system of the holographic stereogram printer device 3.

The holographic stereogram printer device 3 includes a laser light source 31 for radiating a laser light beam of a pre-set wavelength, and a shutter 32 and a half mirror 33 arranged on the optical axis of the laser light beam LI from the laser light source 31. The laser light source 31 is a laser light source that radiates a laser light beam of a wavelength of approximately 532 nm.

The shutter 32 is controlled by the control computer 2 so as to be closed or opened if the recording medium for hologram 30 is not or is exposed to light, respectively. The half mirror 33 is used for separating the laser light L2 traversing the shutter 32 into the reference light beam and the object light beam, with the light beam L3 reflected by the half mirror 33 and the light beam traversing the half mirror 33 being the reference light and the object light, respectively.

On the optical axis of the light beam L3 reflected by the half mirror 33 are sequentially arranged, as an optical system for the reference light, a cylindrical lens 34, a collimator lens 35 for converting the reference light into a collimated light beam and a total refection mirror 36 for reflecting the collimated light from the collimator lens 35.

The light reflected by the half mirror 33 is first converted by the cylindrical lens 34 into the divergent light, which is then converted by the collimator lens 35 into the collimated light. This collimated light is then reflected by the total refection mirror 36 to fall on the recording medium for hologram 30. The recording medium for hologram 30 is arranged so as to be in contact via a matching liquid with a light-introducing block 37 of a transparent glass material for recording hologram elements in accordance with the edge lit system. The reference light beam falls on the recording medium for hologram 30 from a side provided with the light-introducing block 37.

That is, the reference light falls on the light-introducing block 37 via its end 37a to fall at a large angle of incidence on the recording medium for hologram 30 arranged for being contacted via matching liquid with the light-introducing block 37. Specifically, the angle θ between the optical axis of the reference light and the optical axis of the object light as later explained will be approximately 105° C.

On the optical axis of the light beam L4 transmitted through the half mirror 33, there are arrayed, as an optical system for the object light, a total refection mirror 38 for reflecting the transmitted light beam from the half mirror 33, a spatial filter 39 combined from a convex lens and a pin hole, a collimator lens 40 for collimating the object light, a display unit 41 for displaying an image being recorded, a diffusion plate 42 for diffusing the light beam transmitted through the display unit 41, and a cylindrical lens 43 for converging the object light on the recording medium for hologram 30. In addition, a mask 44 having a strip-shaped aperture is arrayed directly ahead of the recording medium for hologram 30, as shown in FIGS. 7A and 7B.

The light beam L4 transmitted through the half mirror 33 is reflected by the total refection mirror 38 so as to be converted by the spatial filter 39 into a diffused light beam emanating from a point light source. The diffused light beam is then collimated by the collimator lens 40 to fall on the display unit 41. The display unit 41 is a transmission type image display device comprised of a liquid crystal display and is controlled by the control computer 2 to display an image corresponding to the image data D5 sent from the control computer 2. The light transmitted through the display unit 41 is modulated in accordance with the image displayed on the display unit 41 and subsequently diffused by the diffusion plate 42 to fall on the cylindrical lens 43. The diffusion plate 42 slightly diffuses the transmitted light beam from the display unit 41 to contribute to improving the picture quality of the holographic stereogram being prepared.

The light transmitted through the display unit 41 is converged in the transverse direction by the cylindrical lens 43. Of the converged light, the light transmitted through the strip-shaped aperture of the mask 44 falls as the object light on the recording medium for hologram 30. That is, with the holographic stereogram printer device 3, the projected light beam from the display unit 41 falls on the recording medium for hologram 30 as the strip-shaped object light. The object light falls on the recording medium for hologram 30, from the side not provided with the light-introducing block 37, so that the optical axis of the object light will be substantially perpendicular to the surface of the recording medium for hologram 30.

In the above optical system, the length of the optical path of the reference light reflected by the half mirror 33 to fall on the recording medium for hologram 30 via the light-introducing block 37 is set so as to be substantially equal to that of the object light incident on the recording medium for hologram 30 via the display unit 41. This increases interference between the reference light and the object light to render it possible to prepare a holographic stereogram which gives a brighter reproduced image.

In the above holographic stereogram printer device 3, a mechanism for dripping the index matching liquid to a space between the light-introducing block 37 and the recording medium for hologram 30 is preferably arranged in the space between the light-introducing block 37 and the recording medium for hologram 30. Specifically, a sponge dipped with an index matching liquid is arranged in contact with the recording medium for hologram 30 in the vicinity of a contact area between the light-introducing block 37 and the recording medium for hologram 30. Thus, each time the recording medium for hologram 30 is fed, the index matching liquid is supplied from the sponge for realizing index matching between the light-introducing block 37 and the recording medium for hologram 30.

For preparing a transmission type holographic stereogram, both the object light and the reference light are caused to fall on one of the surfaces of the recording medium for a hologram. Thus, for preparing the transmission type holographic stereogram by the edge lit system, it is necessary for the reference light to fall on the recording medium for hologram via the light-introducing block from the object light incident side. Therefore, the light-introducing block is arranged between the cylindrical lens for object light collection and the recording medium for hologram. However, because of the spatial constraint, it is extremely difficult to arrange the light-introducing block between the cylindrical lens and the recording medium for hologram.

Conversely, for producing the edge lit system holographic stereogram as the reflection type, it suffices if the object light and the reference light are incident on one surface and on the opposite surface of the recording medium for hologram 30, respectively. Thus, with the above-described holographic stereogram printer device 3, it suffices if the cylindrical lens 43 for converging the object light and the light-introducing block are arranged on one and the other sides of the recording medium for hologram 30 to render it possible to construct the optical system easily without spatial constraints.

Figure 8:
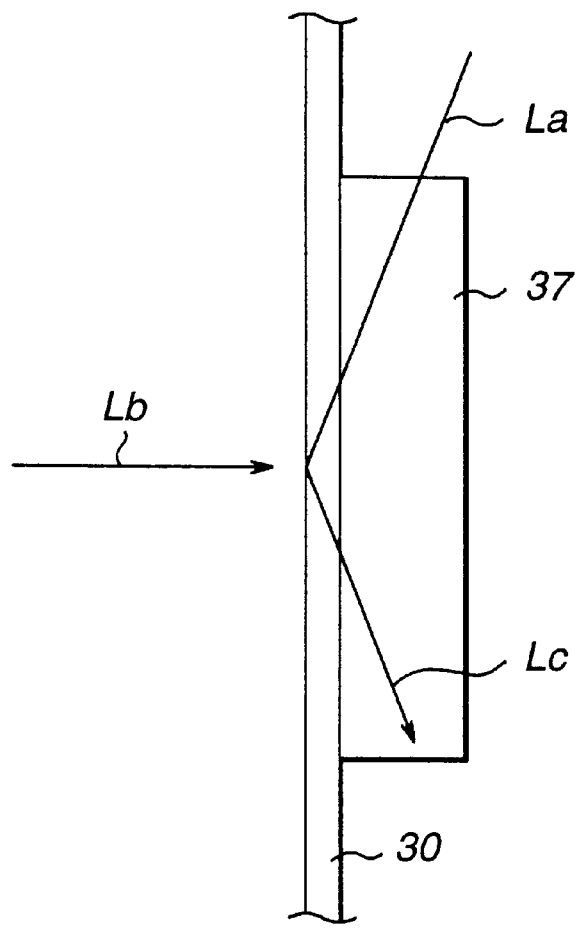
FIG. 8 is a schematic view for illustrating how a transmission holographic stereogram by the edge lit system is being formed.

In such a holographic stereogram printer device 3, not only the a holographic stereogram in which an image is reproduced by the reflected light, but also the holographic stereogram in which the image is reproduced by the transmitted light, are recorded simultaneously on the recording medium for hologram 30. That is, since the reference light La is totally reflected on an interface between the recording medium for hologram 30 and air, and interference fringes between the totally reflected light Lc and the object light Lb are recorded on the recording medium for hologram 30, as shown in FIG. 8, the holographic stereogram capable of reproducing the image by the transmitted light is also recorded on the recording medium for hologram 30.

The holographic stereogram printer device 3 has a recording medium feed mechanism 50 for intermittently feeding the recording medium for hologram 30 one hologram element at a time under control by the control computer 2. This recording medium feed mechanism 50 is configured for intermittently feeding the film-shaped recording medium for hologram 30 based on the control signal from the control computer 2. For preparing the holographic stereogram by the present holographic stereogram printer device 3, an image corresponding to image data of the parallax image string is sequentially recorded as strip-shaped hologram elements on the recording medium for hologram 30 as set in a pre-determined state on the recording medium feed mechanism 50.

Figure 9:
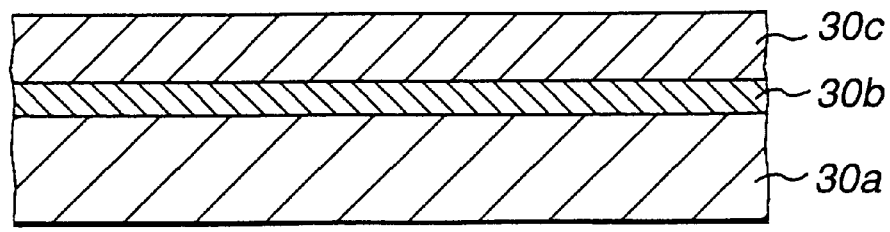
FIG. 9 is a cross-sectional view showing a typical recording medium for hologram.

Referring to FIGS. 9 and 10, the recording medium for hologram 30, used in the above-described system for preparing the holographic stereogram, is explained in detail.

Referring to FIG. 9, the recording medium for hologram 30 is a so-called film coated type recording medium in which a photopolymer layer 30b formed of a photopolymerization type photopolymer is formed on a tape-shaped film base material 30a and a cover sheet 30c is deposited on the photopolymer layer 30b. Specifically, the photopolymer layer 30b, operating as a photosensitive portion, is formed of 'OMNI-DEX' manufactured by DU PONT, with the film thickness being approximately 20 $\mu$m. Meanwhile, the material 'OMNI-DEX' has a refractive index of approximately 1.5.

Figure 10A:
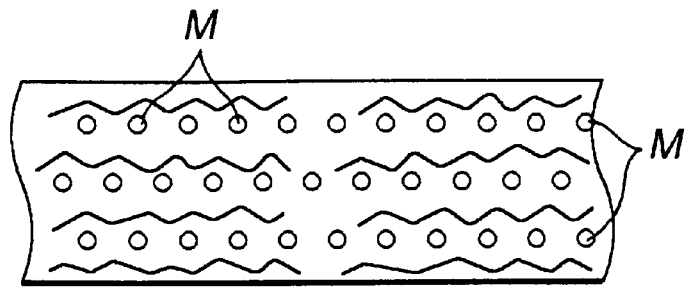
FIG. 10 consisting of FIGS. 10A through 10B is a schematic view for illustrating the process for photosensitization of a photopolymerization type photopolymer.
Figure 10B:
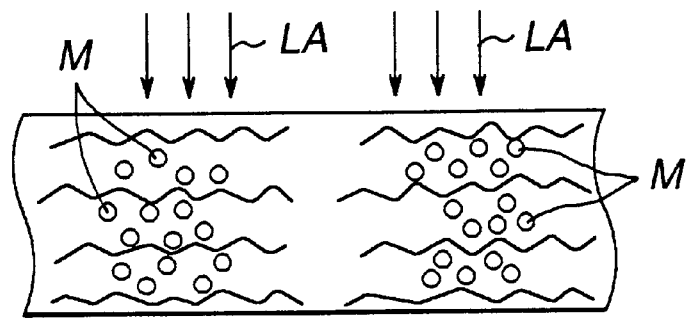
Figure 10C:
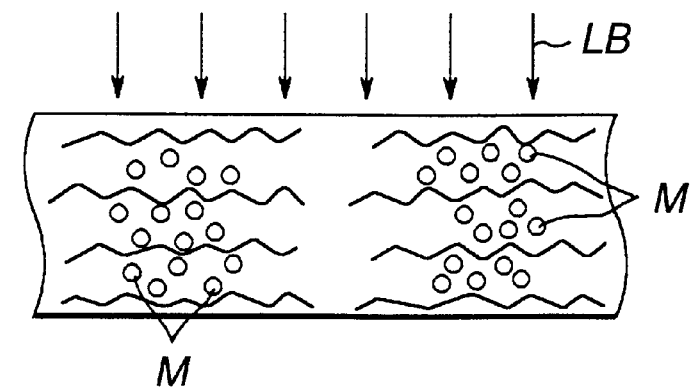

In the initial state of the photopolymerization type photopolymer, the monomer M is uniformly distributed in the matrix polymer, as shown in FIG. 10A. If the light LA of the power of the order of 10 to 400 mJ/cm$^2$ is illuminated, the monomer M is polymerized in the light-exposed portion, as shown in FIG. 10B. With the progress in polymerization, the monomer M migrates from the surrounding area to cause local variation in the concentration of the monomer M. This causes modulation in the refractive index. By subsequently illuminating the ultraviolet light or the visible light LB of a power of the order of 1000 mJ/cm$^2$ on the entire surface of the polymer, as shown in FIG. 10C, polymerization of the monomer M comes to a close. Since the photopolymerization type photopolymer is varied in this manner in the refractive index depending on the incident light, the interference fringes produced by interference between the reference light and the object light can be recorded as variations in the refractive index.

In the recording medium for hologram 30, employing the photopolymerization type photopolymer, there is no necessity to perform special development after light exposure. Thus it is possible to simplify the structure with the holographic stereogram printer device 3 employing the recording medium for hologram in turn employing the photopolymerization type photopolymer in its photosensitive portion.

Figure 11:
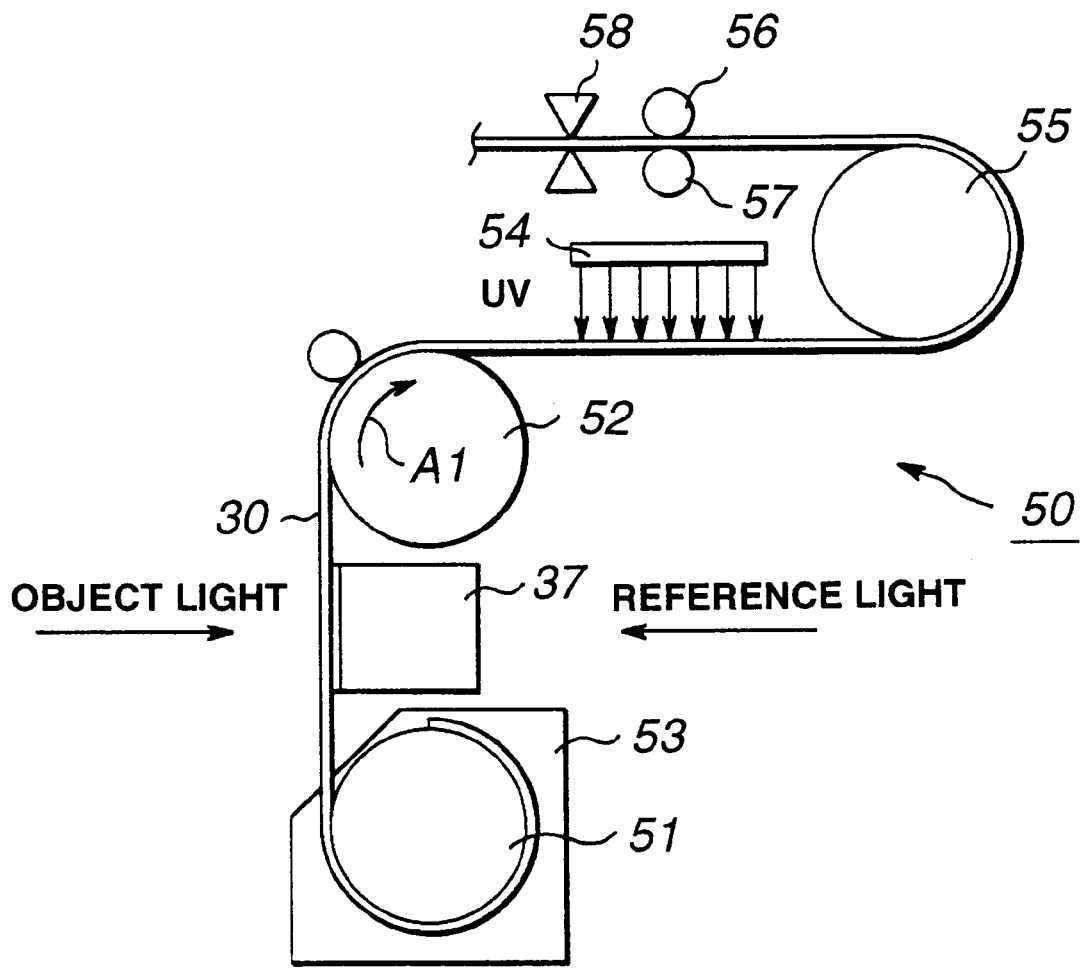
FIG. 11 is a schematic view showing an illustrative structure of a feed mechanism for a recording medium.
Figure 12:
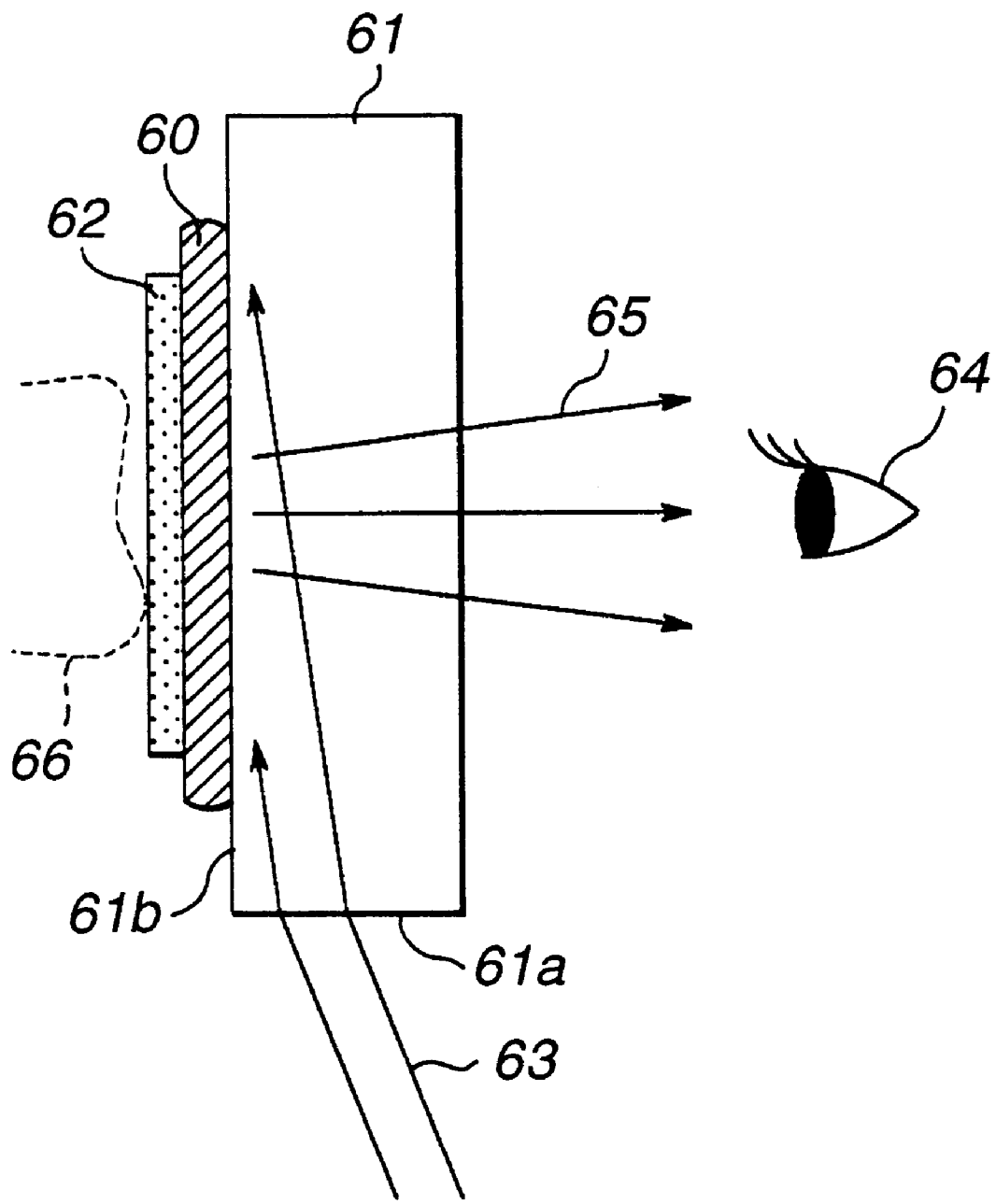
FIG. 12 is a schematic view showing how a holographic stereogram is reproduced with the reflection type.

The recording medium feed mechanism 50 is explained in detail with reference to FIG. 11 showing, to an enlarged scale, the recording medium feed mechanism 50 of the holographic stereogram printer device 3.

The recording medium feed mechanism 50 includes a roll 51 and an intermittent feed roll 52, as shown in FIG. 11. The recording medium for hologram 30 is held in a film cartridge 53 in a state in which the recording medium is wrapped around a roll 51. With this recording medium feed mechanism 50, the roll 51 in the film cartridge 53 loaded at a pre-set position is fulcrumed for rotation at a pre-set torque, while the recording medium for hologram 30, reeled out from the film cartridge 53, can be held by the roll 51 and the intermittent feed roll 52. At this time, the recording medium feed mechanism 50 holds the recording medium for hologram 30 so that the plane of the recording medium for hologram 30 will be perpendicular to the object light between the roll 51 and the intermittent feed roll 52. The roll 51 and the intermittent feed roll 52 are biased by a torsion coil spring in a direction away from each other, so that a pre-set tension is applied to the recording medium for hologram 30 loaded between the roll 51 and the intermittent feed roll 52.

The intermittent feed roll 52 of the recording medium feed mechanism 50 is connected to a stepping motor, not shown, so that the roll 52 can be rotated freely in the direction indicated by arrow A1 under the force of rotation from the stepping motor. Based on the control signal S2 supplied from the control computer 2, the stepping motor sequentially rotates the intermittent feed roll 52 a pre-set angle corresponding to a hologram element each time light exposure for one image comes to a close. This causes the recording medium for hologram 30 to be fed one hologram element each time an image is exposed to light.

On the downstream side of the intermittent feed roll 52 in the travel path of the recording medium for hologram 30 is arranged an ultraviolet lamp 54. This ultraviolet lamp 54 is configured for completing polymerization of the monomer m of the light-exposed recording medium for hologram 30 by illuminating an ultraviolet light beam UV of a pre-set power to the recording medium for hologram 30 fed via the intermittent feed roll 52.

Downstream from the ultraviolet lamp 54 on the travel path of the recording medium for hologram 30 are sequentially arranged a rotatably fulcrumed heat roll 55, a pair of ejecting feed rolls 56, 57 and a cutter 58.

The ejecting feed rolls 56, 57 are adapted for feeding the recording medium for hologram 30 so that the cover sheet 30c of the recording medium for hologram 30 will be intimately wrapped about a half circumference on the peripheral surface of the heat roll 55. These ejecting feed rolls 56, 57 are connected to a stepping monitor (not shown), so as to be rotated based on the power of rotation from the stepping motor. The stepping motor sequentially rotates the ejecting feed rolls 56, 57, in synchronism with the rotation of the intermittent feed roll 52 by a pre-set angle corresponding to the hologram element each time light exposure for one image comes to a close. This feeds the recording medium for hologram 30 without slacking between the intermittent feed roll 52 and the ejecting feed rolls 56, 57 in an intimately wrapped state around the periphery of the heat roll 55.

The heat roll 55 has inner heating means whereby the peripheral surface of the heat roll is maintained at a temperature of the order of 120° C. The heat roll 55 heats the photopolymer layer 30b of the recording medium for hologram 30 fed thereto via the cover sheet 30c to increase the degree of refractive index modulation of the photopolymer layer 30b to fix the recorded image on the recording medium for hologram 30. To this end, the outside diameter of the heat roll 55 is selected so that the time substantially corresponding to the time during which the recorded image can be fixed will elapse since the recording medium for hologram 30 starts to be abutted against the peripheral surface of the heat roll 55 until the recording medium for hologram 30 is disengaged from the peripheral surface of the heat roll.

The cutter 58 includes a cutter driving mechanism (not shown) which may be driven for severing the recording medium for hologram 30 fed thereto. After all images of the image data of the parallax image string have been recorded on the recording medium for hologram 30 and all portions of the recording medium having the images of the recording medium for hologram 30 recorded thereon have been ejected to outside the cutter 58, the cutter driving mechanism drives the cutter, based on the control signal S2 supplied from the control computer 2. This severs the portion of the recording medium for hologram 30 carrying the picture data from the remaining portion thereof so that the severed portion of the recording medium for hologram 30 is ejected outside as a sole holographic stereogram.

The operation of preparing the holographic stereogram by the above-described system for preparing the holographic stereogram is hereinafter explained. In preparing the holographic stereogram, the control computer 2 drives the display unit 41 for displaying the image on the display unit 41, based on the image data D5 supplied from the data processing unit 1. The control computer 2 then sends the control signal S1 to the shutter 32 to open the shutter 32 for a pre-set time for exposing the recording medium for hologram 30 to light. Of the beam L2 radiated by the laser light source 31 and transmitted through the shutter 32, a light beam L3 reflected by the half mirror 33 falls as reference light via light-introducing block 37 on the recording medium for hologram 30. The light beam L4 transmitted through the half mirror 33 is the projecting light carrying the image displayed on the display device 41. This projecting light falls on the recording medium for hologram 30 as the object light. This records an image displayed on the display unit 41 as a strip-shaped hologram element on the recording medium for hologram 30.

When the recording of an image on the recording medium for hologram 30 comes to a close, the control computer 2 sends control signals to the stepping motor connected to the intermittent feed roll 52 and to the stepping motor connected to the ejecting feed rolls 56, 57 for driving these stepping motors to feed the recording medium for hologram 30 by one hologram element.

The control computer 2 drives the display unit 41 based on the next image data D5 supplied from the data processing unit 1 for displaying the next image on the display unit 41. The operation similar to that described above is repeated for sequentially recording the images corresponding to the image data D5 supplied from the data processing unit 1 as strip-shaped hologram elements on the recording medium for hologram 30.

That is, with the present system for formulating the holographic stereogram, images corresponding to the image data recorded on the recording device 12 are sequentially displayed on the display unit 41, at the same time as the shutter 32 is opened every image so that the images are sequentially recorded as the strip-shaped hologram elements on the recording medium for hologram 30. Since the recording medium for hologram 30 is fed by one hologram element every image, the hologram elements are arrayed side-by-side in the transverse direction. This records plural images on the recording medium for hologram 30 as plural hologram elements arrayed side-by-side in the transverse direction, so that there is obtained a holographic stereogram having the parallax in the transverse direction.

The recording medium for hologram 30, having the hologram elements recorded thereon as described above, is irradiated with the ultraviolet light UV from the ultraviolet lamp 54. This completes polymerization of the monomer M. The recording medium for hologram 30 then is heated by the heat roll 55 to fix the recorded images.

When the portion of the recording medium for hologram 30 carrying the recorded image is fed to outside in its entirety, the control computer 2 sends a control signal S2 to a cutter driving mechanism. This severs the portion of the recording medium for hologram 30 carrying the recorded images by the cutter 58 to eject the severed portion carrying the recorded images as a holographic stereogram to outside.

By the above process, the reflection type holographic stereogram of the edge lit system, having the parallax in the transverse direction, is completed.

The method for reproducing an image from the above holographic stereogram in accordance with the present invention is hereinafter explained.

In a conventional reproducing method, a three-dimensional image is reproduced by the reflection type from the reflection type holographic stereogram of the edge lit system produced as described above. That is, in the conventional reproducing method, a holographic stereogram 62 is bonded to a light-introducing block 61 via an index matching liquid 60, after which a reproducing illuminating light beam 63 is caused to fall from an end 61a of the light-introducing block 61 to the holographic stereogram 62. The holographic stereogram 62 is bonded to a surface 61b of the light-introducing block 61 further away from the viewer 64.

At this time, a reproduced image 66 generated by a light beam 65 diffracted from the holographic stereogram 62 in the reflection mode is observed by the viewer 64. Thus, if the three-dimensional image is reproduced, the reproduced image 66 is reproduced as if it were located more inwardly than the light-introducing block 61 when the image is viewed by the viewer 64.

Figure 13:
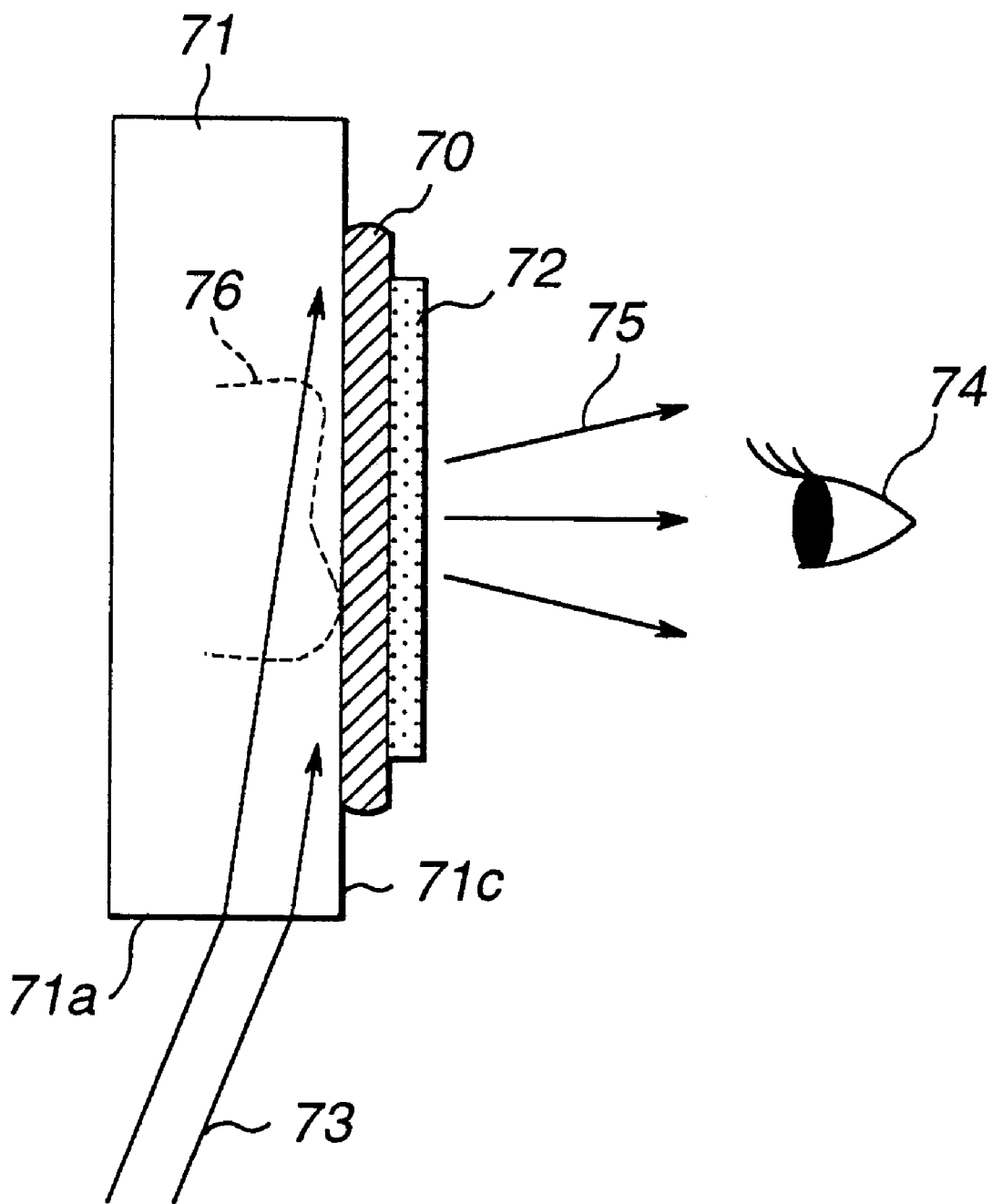
FIG. 13 is a schematic view showing how a holographic stereogram is reproduced with the transmission type.

Conversely, with the present invention, an image from the reflection type holographic stereogram of the edge lit system is reproduced by the transmission type. That is, a holographic stereogram 72 is bonded via an index matching liquid 70 to a light-introducing block 71 as shown in FIG. 13 and a reproducing illuminating light beam 73 is caused to fall on the holographic stereogram 72 from an end 71a of the light-introducing block 71. The holographic stereogram 72 is bonded to a surface 71c of the light-introducing block 71 closer to the viewer 74.

At this time, a reproduced image 76 diffracted from the holographic stereogram 72 in the transmission mode is observed by the viewer 74. This is ascribable to the fact that, since the reference light beam undergoes total reflection on the interface between the recording medium for hologram 30 and air during recording, not only the holographic stereogram reproduced by the reflection mode but also the holographic stereogram that can be reproduced by the transmission mode has been formed, as explained with reference to FIG. 8.

According to the present invention, an image is reproduced in the transmission mode as described above, and also an image is reproduced using a light-introducing block having a curved surface. In the conventional reproducing method, in which the surface to which is bonded the holographic stereogram is planar, the angle of visibility is limited, such that it is impossible to display an area directly at back of the object. According to the present invention, it is possible to enlarge the angle of visibility significantly by employing a light-introducing block having a curved surface and by arranging a holographic stereogram on the curved surface.

Figure 14:
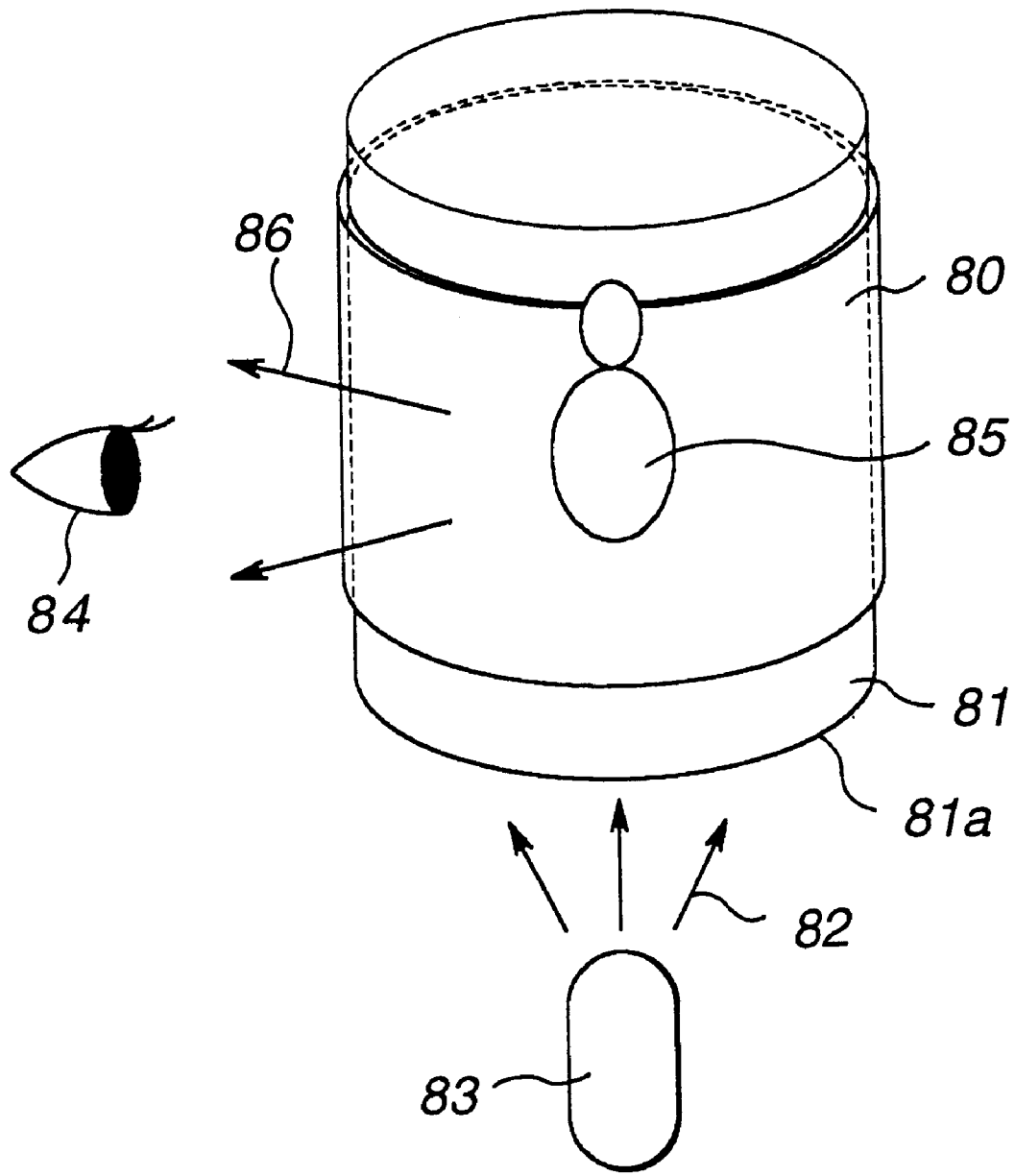
FIG. 14 is a schematic view showing an illustrative structure of an image reproducing device according to the present invention.

Referring to FIG. 14, an illustrative structure of an image reproducing device embodying the present invention is explained. The image reproducing device, now explained, reproduces the image in the vicinity of the center of the cylindrically rounded holographic stereogram. Thus, such a holographic stereogram is used in which a reproduced image presents itself in a floating fashion at the mid portion when the holographic stereogram is rounded to a cylindrical shape. That is, when producing a holographic stereogram the image data D5 recorded on the recording medium for hologram 30 is pre-processed by the image processing computer 11 of the data processing unit 1, so that a reproduced image is located at a mid portion of the cylindrically rounded holographic stereogram.

This image reproducing device is an image reproducing device of the edge-lit system, and includes a columnar-shaped light-introducing block 81, on which a holographic stereogram 80 is stuck, and a light source 83 for illuminating a reproducing illuminating light beam 82 from an end face 81a of the light-introducing block 81, as shown in FIG. 14. The holographic stereogram 80 is such a holographic stereogram of the edge-lit system in which the object light and the reference light are incident on one and the opposite surfaces of the recording medium for hologram 30 so that the holographic stereogram has the information of many parallax images recorded thereon.

The light-introducing block 81 is used for introducing the reproducing illuminating light beam 82 into the holographic stereogram 80 and is a columnar-shaped block formed of transparent glass or acrylic resin. The holographic stereogram 80 to be reproduced is stuck on the lateral surface of the light-introducing block 81 via an index matching liquid.

It suffices if the light-introducing block 81 is shaped so that the reproducing illuminating light beam 82 will be incident on the holographic stereogram 80 at a pre-set angle, while it is unnecessary for the light-introducing block 81 to be of a true columnar shape. For example, the light-introducing block 81 may be partially columnar-shaped, or may also be cylindrically-shaped in its entirety. That is, the light-introducing block 81 may be of any suitable shape if the angle of incidence of the reference light incident on the recording medium for hologram 30 during recording is coincident with the angle of incidence of the reproducing illuminating light beam 82 for the holographic stereogram 30.

On the other hand, the light source 83 is arranged for illuminating the reproducing illuminating light beam 82 on the holographic stereogram 80. As the light source 80, a light-emitting diode is preferred because the light-emitting diode has an extremely high light-emission efficiency and hence can be used for a practically sufficient time with a battery. By employing the light-emitting diode as the light source 83, it becomes possible to use a battery as a driving power source, thus enabling reduction in size and cost.

In the above-described image reproducing device, the light source 83 for the reproducing illuminating light beam 82 can be unified with the light-introducing block 81 to simplify and reduce the size of the optical system. Moreover, by unifying the light source 83 for the reproducing illuminating light beam 82 and the light-introducing block 81, the angle of incidence of the reproducing illuminating light beam 82 to the holographic stereogram 80 can be perpetually optimized to enable a high-quality reproduced image 85 at all times. The light source 83 is arranged on the center axis of the light-introducing block 81 on one or the other end face thereof. This enables the reproduced image 85 to be observed by the user 84 under an optimum condition regardless of the viewing direction.

If the wavelength of the laser light used in fabricating the holographic stereogram 80 is approximately 532 nm, the angle θ between the optical axis of the reference light and the optical axis of the object light is approximately 105°, the film thickness of the photosensitive portion of the recording medium for hologram 30 is approximately 20 μm and the refractive index thereof is approximately 1.5, the wavelength selection width of the holographic stereogram is approximately 50 nm. If the holographic stereogram 80 is prepared under this condition, a light-emitting diode emitting the light of a center wavelength of approximately 525 nm and a wavelength width of approximately 50 nm is used as the light source 83.

For reproducing a three-dimensional image from the holographic stereogram 80, using the above-described image reproducing device, the holographic stereogram 80 is stuck to the lateral surface of the light-introducing block 81 via a matching liquid. The reproducing illuminating light beam 82 is illuminated on the holographic stereogram 80 from the light source 83 via the light-introducing block 81. At this time, the reproduced image 85 presents itself in a floating fashion by a diffracted light beam 86 produced when the reproducing illuminating light beam 82 is transmitted through the holographic stereogram 80. This reproduced image 85 appears as if the object were situated at a position closer to the viewer, thus giving a highly three-dimensional image.

Meanwhile, for reproducing the holographic stereogram by the reflection type, the reproduced image can usually be obtained, even if the white light beam is used as a reproducing illumination, because of an extremely high wavelength selectivity. Conversely, for reproducing the holographic stereogram with the transmission type, difficulties are met in reproducing the holographic stereogram with the white light, because the wavelength selectivity is lower than if the holographic stereogram is reproduced with the reflection type. Therefore, if the holographic stereogram is reproduced with the transmission type, a light source of a high color purity is preferably used as the light source for the reproducing illuminating light beam. In the above embodiment, a light-emitting diode emitting the light of high color purity is used as the light source 83 of the reproducing illuminating light beam 82. This compensates for low wavelength selectivity to give a clear reproduced image. The light-emitting diode also has a merit that it is close to a point light source and hence can prevent the reproduced image 85 from becoming blurred due to spreading of the light source, and a merit that it has an extremely high light emitting efficiency and scarcely generates heat.

However, the light source 83 of the reproducing illuminating light beam 82 is not limited to the light-emitting diode and any suitable light source capable of generating the light of high color purity, such as a semiconductor laser, can be similarly used for realizing a clear reproduced image 85 suffering from less blurring. The light improved in color purity by employing a wavelength selection filter or a narrow-band reflection mirror may be used as the reproducing illuminating light beam 82.

Figure 15:
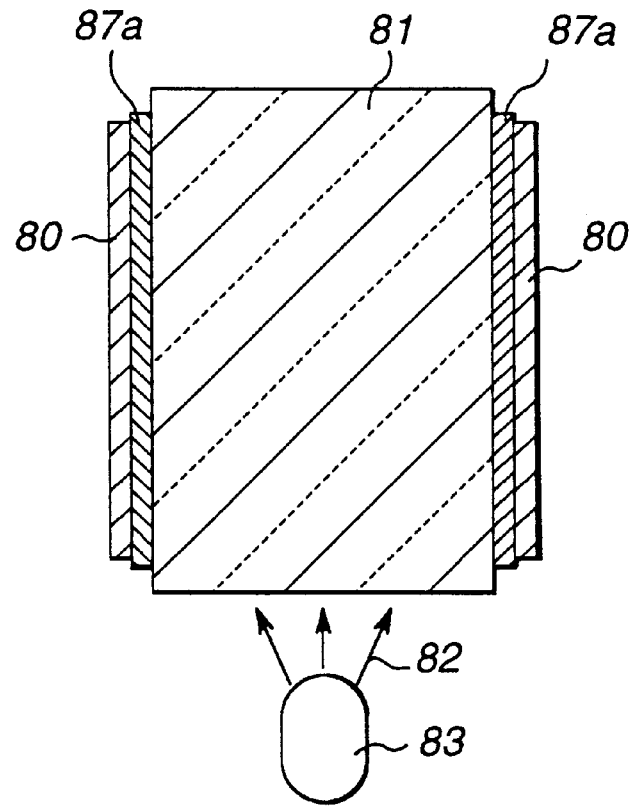
FIG. 15 is a schematic cross-sectional view showing another illustrative structure of an image reproducing device according to the present invention.
Figure 16:
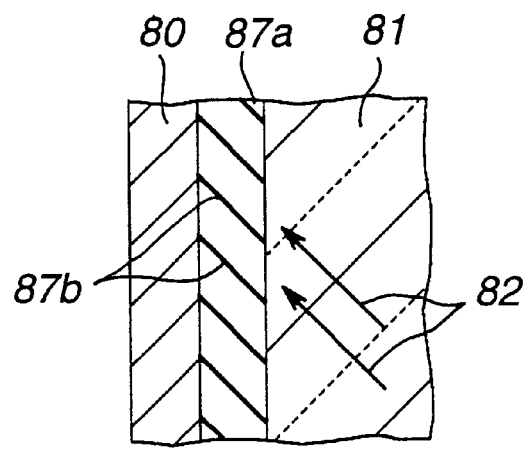
FIG. 16 is an enlarged cross-sectional view showing essential portion of an image reproducing device shown in FIG. 15.

In the image reproducing device, a louver film 87a, which is an optical filter transmitting the reproducing illuminating light beam 82 without transmitting the light perpendicular to its surface, may be arranged between the light-introducing block 81 and the holographic stereogram 80, as shown in FIG. 15. This louver film 87a is made up of a large number of louvers 87b, arrayed parallel to one another at a pre-set separation for operating as a physical blind, as shown in FIG. 16. Each louver 87b is inclined relative to the surface at an angle substantially corresponding to the angle of incidence of the reproducing illuminating light beam 82. Therefore, the louver film 87a has characteristics that it does not permit transmission of the light incident from a direction perpendicular to its surface. If this louver film 87a is arranged between the light-introducing block 81 and the holographic stereogram 80 for optical contact without the interposition of air, an unneeded image reproduced form the rear portion of the cylindrically rounded holographic stereogram ceases to be observed when the holographic stereogram 80 is viewed from the direction perpendicular to the surface of the holographic stereogram 80. If the louver 87b is of a color that can readily absorb the light, such as a black color, the background of the reproduced image 85 becomes darker to raise the contrast of the reproduced image 85.

Figure 17:
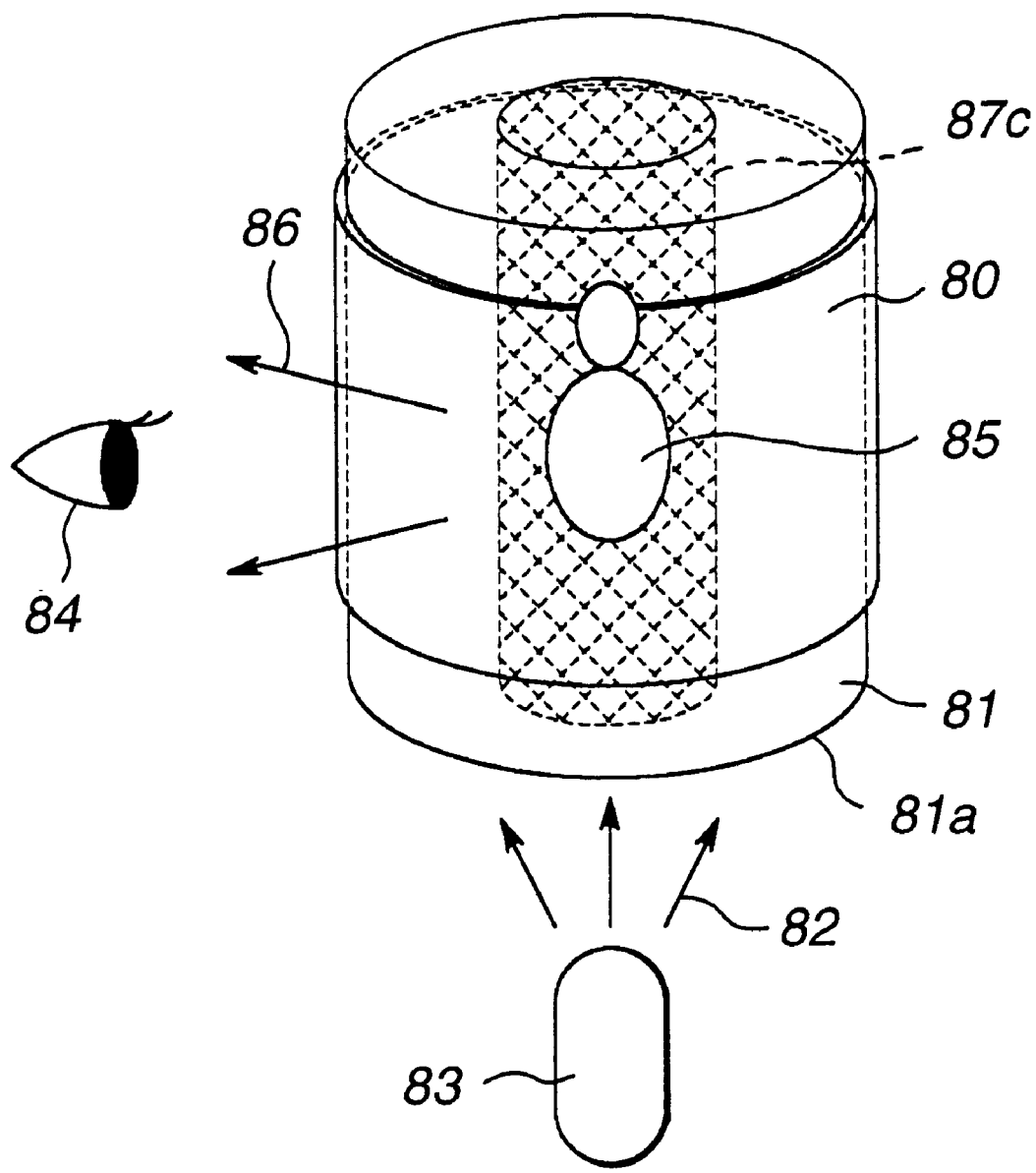
FIG. 17 is a schematic view showing another illustrative structure of an image reproducing device according to the present invention.

In the image reproducing device, an opaque member 87c may be arranged within the interior of the light-introducing block 81 in register with the reproduced image 85, as shown in FIG. 17. In this case, an opaque member 87c, such as black rubber or plastic, is arranged at a position in which the reproduced image 85 presents itself in a floated fashion and which does not obstruct incidence of the reproducing illuminating light beam 82. This darkens the background of the reproduced image 85 to raise the contrast of the reproduced image 85. Moreover, by arranging the opaque member 87c, the viewer 84 cannot see the unneeded image reproduced from the rearward portion of the cylindrically rounded holographic stereogram 80 and hence the viewer 84 can observe a good reproduced image 85 which is clearer and blurred to a lesser extent.

Figure 18:
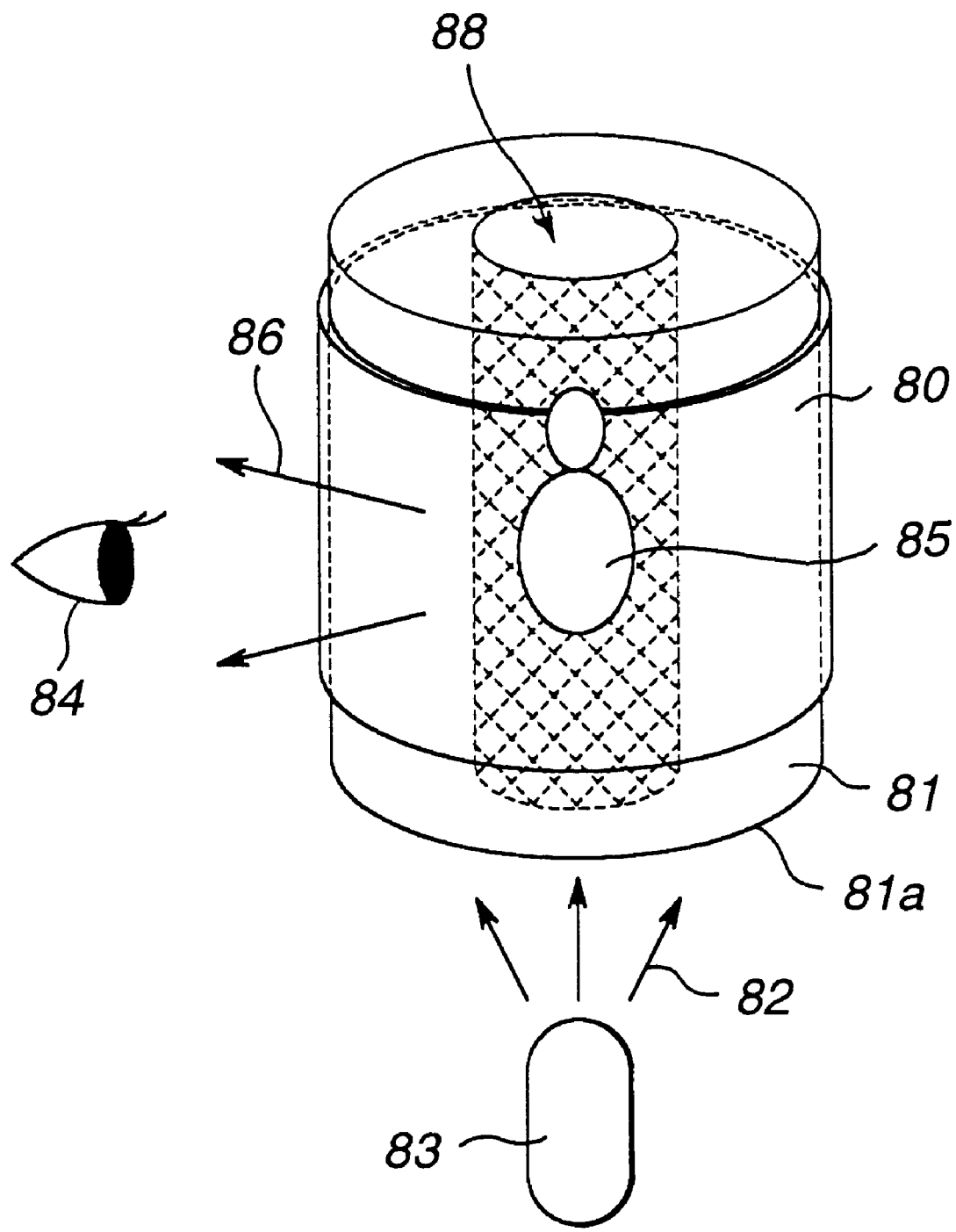
FIG. 18 is a schematic view showing a further illustrative structure of an image reproducing device according to the present invention.

In the image reproducing device, the light-introducing block 81 may be rounded in a cylindrical shape for defining a hollow portion 88 in the inside of the cylindrical portion, as shown in FIG. 18. The hollow portion 88 is provided at a position in register with the reproduced image 85 and which is not obstructive to the illumination of the reproducing illuminating light beam 82. Within this hollow portion 88 is provided a member required for illuminating the reproducing illuminating light beam 82. The member required for illumination of the reproducing illuminating light beam 82 may, for example, be a battery for turning on the light source 83. By arranging the battery in the hollow portion 88 of the light-introducing block 81, the image reproducing device may be further reduced in size.

Figure 19:
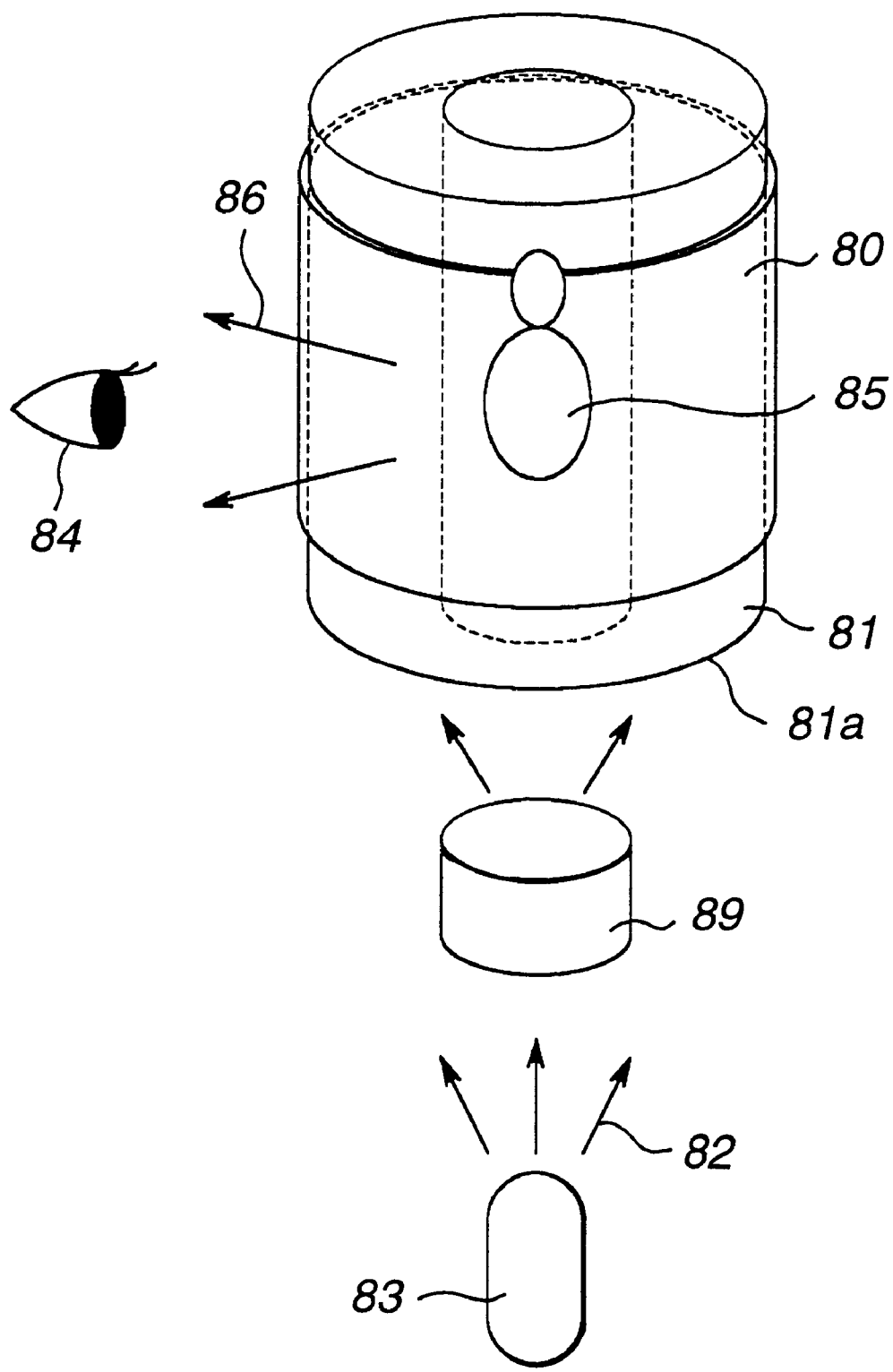
FIG. 19 is a schematic view showing a further illustrative structure of an image reproducing device according to the present invention.
Figure 20:
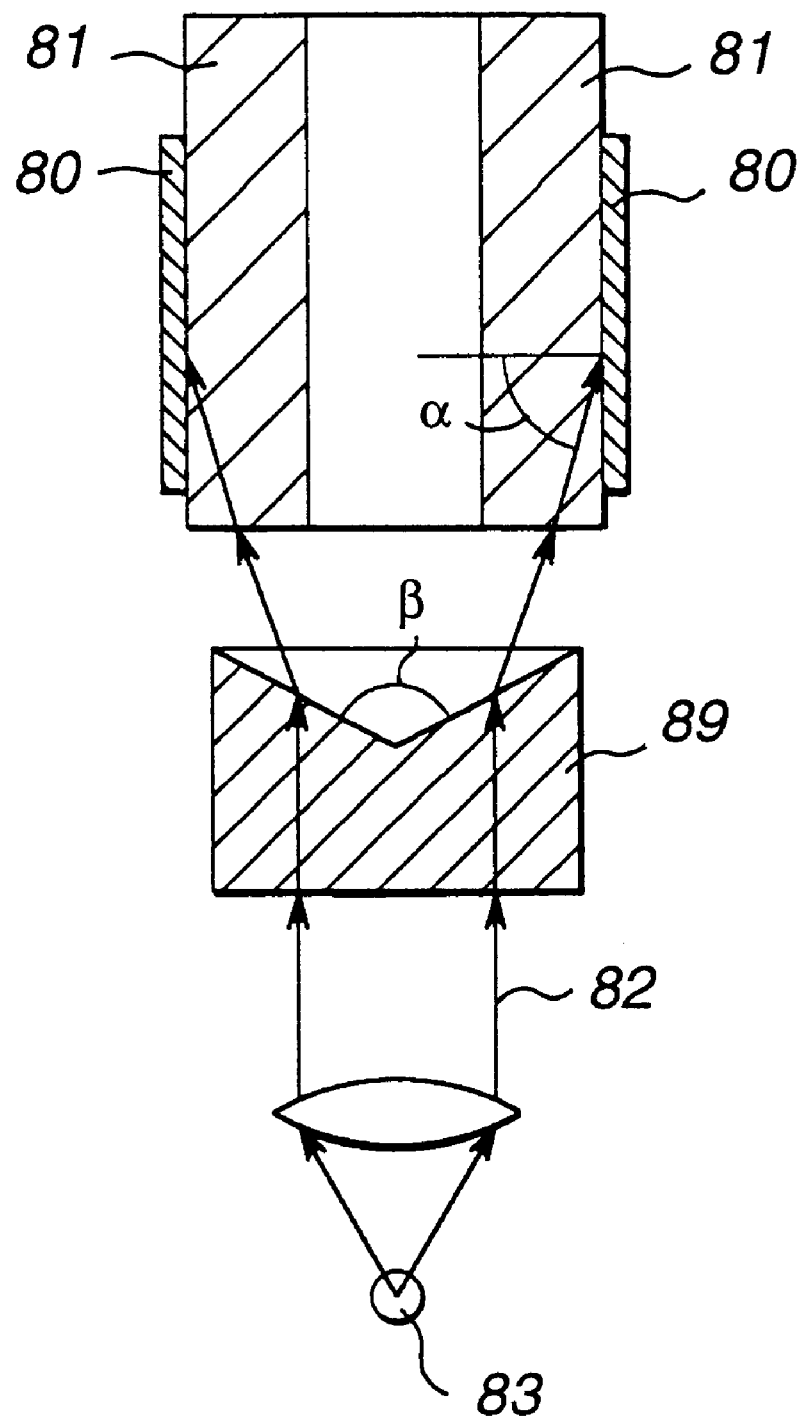
FIG. 20 is a schematic view showing how the reproducing illuminating light is routed to a holographic stereogram.

The image reproducing device may also be provided with an optical component 89 for routing the reproducing illuminating light beam 82 from the light source 83 into the light-introducing block 81, as shown in FIG. 19. As this optical component 89, a prism substantially columnar in shape and having an upper surface formed with a conical recess, as shown in FIG. 20, is desirable. The reproducing illuminating light beam 82 from the light source 83 is collimated to fall on the optical component 89 and the light transmitted through the optical component 89 is routed to the light-introducing block 81.

It is assumed that the wavelength $\lambda$ of the reproducing illuminating light beam 82 is 532 nm and the light-introducing block 81 and the optical component 89 are formed of an acryl resin with the refractive index n=1.459. If the angle of incidence $\alpha$ of the reproducing illuminating light beam 82 to the holographic stereogram 80 of 80° is desirable, as shown in FIG. 20, it suffices if the apex angle $\beta$ of the conical recess of the optical component 89 is set to 128°. If the angle of incidence a of the reproducing illuminating light beam 82 to the holographic stereogram 80 of 75° is desirable, it suffices if the apex angle $\beta$ of the conical recess of the optical component 89 is set to 112°. If the angle of incidence $\alpha$ of the reproducing illuminating light beam 82 to the holographic stereogram 80 of 70° is desirable, it suffices if the apex angle $\beta$ of the conical recess of the optical component 89 is set to 103°. Likewise, if the angle of incidence a of the reproducing illuminating light beam 82 to the holographic stereogram 80 of 65° is desirable, it suffices if the apex angle P of the conical recess of the optical component 89 is set to 98°.

By employing this optical component 89, the reproducing illuminating light beam 82 can be illuminated highly efficiently to the holographic stereogram 80. Conversely, failing the optical component 89, since the light emanated from the light source 83 is diffused with a peak of light intensity at a mid portion, more light falls on the mid portion not used for image reproduction, thus significantly lowering the efficiency.

Figure 21:
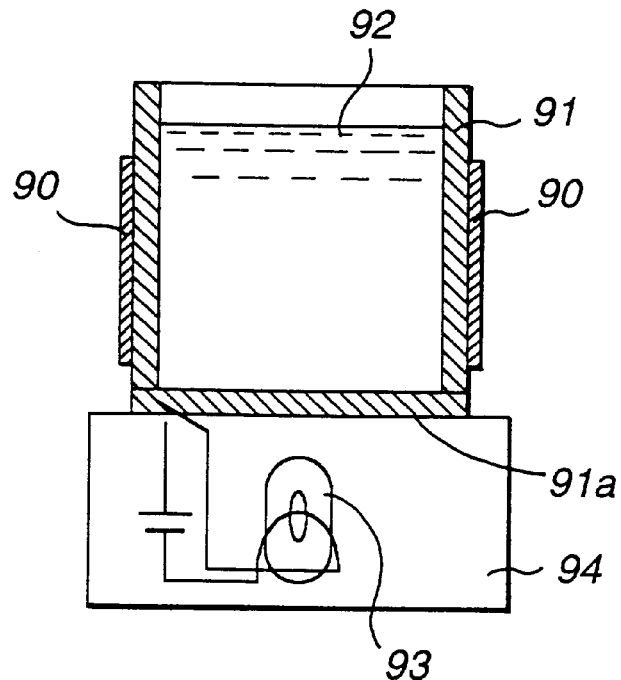
FIG. 21 is a schematic view showing a further illustrative structure of an image reproducing device according to the present invention.

The image reproducing device may also be configured as shown in FIG. 21. The image reproducing device, shown in FIG. 21, includes a vessel-shaped light-introducing block 91, to which is bonded the holographic stereogram 90, and a light source 93 for illuminating the reproducing illuminating light beam from a bottom 91a of the vessel-shaped light-introducing block 91.

The vessel-shaped light-introducing block 91 is a cylindrically-shaped cup of transparent glass or acrylic resin. The holographic stereogram 90 to be reproduced is stuck to the lateral surface of the vessel-shaped light-introducing block 91 via an index matching liquid.

For reproducing an image from the holographic stereogram 90 using this image reproducing device, the holographic stereogram 90 is stuck to the lateral surface of the vessel-shaped light-introducing block 91 via an index matching liquid, and the vessel-shaped light-introducing block 91 is then charged with a liquid 91. The reproducing illuminating light beam is illuminated from the light source 93 to the holographic stereogram 90 via the vessel-shaped light-introducing block 91 and the liquid 92 charged therein. An image is reproduced by the light which is the reproducing illuminating light beam diffracted when traversing the holographic stereogram 90.

That is, with the present image reproducing device, the portion of the device adapted for routing the light to the holographic stereogram 90 is constituted by the vessel-shaped light-introducing block 91 formed of the light transmitting material and the liquid 92 charged therein, without being constructed solely by the homogeneous rigid material.

Meanwhile, in the present image reproducing device, the refractive index of the vessel-shaped light-introducing block 91 and that of the liquid 92 charged therein are preferably close to the refractive index of the holographic stereogram 90. This reduces unneeded refraction to realize a clearer reproduced image.

The light-introducing block 91 needs only to be shaped to permit the reproducing illuminating light beam to fall on the holographic stereogram 90 at a pre-set angle. That is, the light-introducing block 91 may be partially cylindrical or angled instead of being of a true cylindrical shape. Specifically, the light-introducing block 9 may be of any suitable shape if the angle of incidence of the reference light incident on the recording medium for hologram 30 during recording is coincident with that of the reproducing illuminating light beam on the holographic stereogram 80 and the light-introducing block 91 is constructed in a manner free from leakage of the liquid 92.

The present image reproducing device reproduces an image with the liquid 92 charged into the light-introducing block 91. Of course, the liquid 92 need not be charged into the light-introducing block 91 until the image is reproduced. Therefore, unless the image is reproduced, the present image reproducing device is lightweight and handy to transport. Moreover, plural light-introducing blocks 91 may be stacked together for storage thus enhancing convenience in handling during storage. Moreover, since it suffices to use a usual cup-shaped article as the light-introducing block 91, thus reducing the cost of the image reproducing device.

In the image reproducing device shown in FIG. 21, the light source 93 for the reproducing illuminating light beam is enclosed in the support 94 on which to set the light-introducing block 91. Specifically, a cup is used as the light-introducing block 91, the support 94 is a coaster for the cup and the light source 93 is enclosed in the coaster. By so doing, if the beverage is filled in the cup, and the cup is put on the coaster, the reproduced image is floated in the cup for appreciation of the reproduced image.

If the support 94 enclosing the light source 93 is used, the light-introducing block 91 put on the support 94 is preferably so set that the light-introducing block 91 is within a pre-set range. Specifically, the coaster which is to be the support 94 is formed with a recess in register with the shape of the cup which is to be the light-introducing block 91 and, when the cup is placed on the coaster, the cup is fitted into the recess. By having the light-introducing block 91 adapted for being placed at a pre-set site on the support 94, the relative position between the holographic stereogram 90 and the light source 93 can be set to be constant at all times when the light-introducing block 91 is set on the support 94, thus making possible image reproduction at all times under optimum conditions.

The support 94 may be provided with sensor means for detecting the setting of the light-introducing block 91 so that the light source 93 emits light only when the setting state of the light-introducing block 91 on the support 94 is detected by sensor means. Specifically, the coaster may be provided with a sensor for detecting that the cup operating as the light-introducing block 91 has been set so that the light source 93 emits light only if the cup has been set on the coaster. By so doing, the light source 93 emits light only when the cup is placed on the coaster, thus evading wasteful power consumption.

Figure 22:
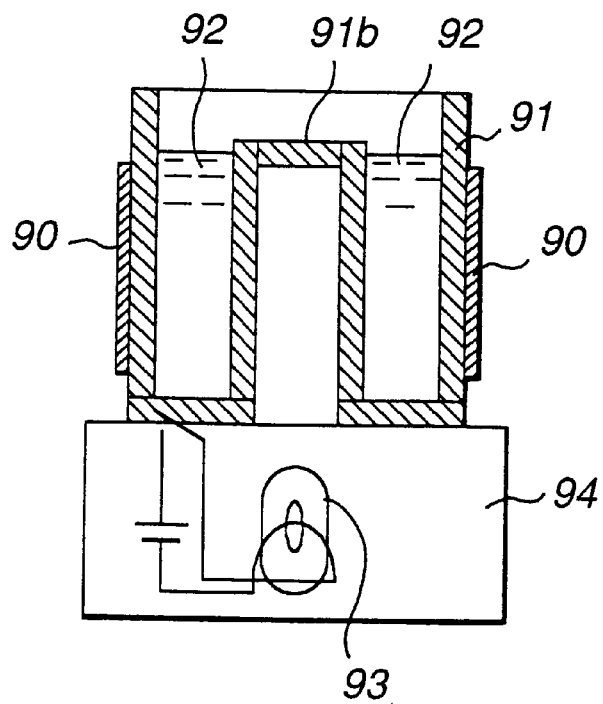
FIG. 22 is a schematic view showing a further illustrative structure of an image reproducing device according to the present invention.

In the above-described image reproducing device, the light-introducing block 91 may be configured as shown in FIG. 22. The light-introducing block 91 shown in FIG. 22 is of a dual structure not obstructive to illumination of the reproducing illuminating light beam, and a mid portion 91b of the light-introducing block 91 corresponding to the floated representation of the reproduced image is swollen out in a convex shape. An opaque member, such as black rubber or plastics, is arranged at the convexed mid portion 91b. That is, the light-introducing block 91 is of a structure not allowing the liquid to be intruded to a site of image reproduction, with the opaque member being arranged in this site of image reproduction.

If the light-introducing block 91 is used, the background of the reproduced image becomes dark to raise the contrast of the reproduced image as in the embodiment shown in FIG. 17. Moreover, by arranging the opaque member, the unneeded reproduced image reproduced from the backward portion of the cylindrically rounded holographic stereogram becomes invisible to the viewer so that the or she can see an optimum reproduced image which is clearer and blurred to a lesser extent.

Figure 23:
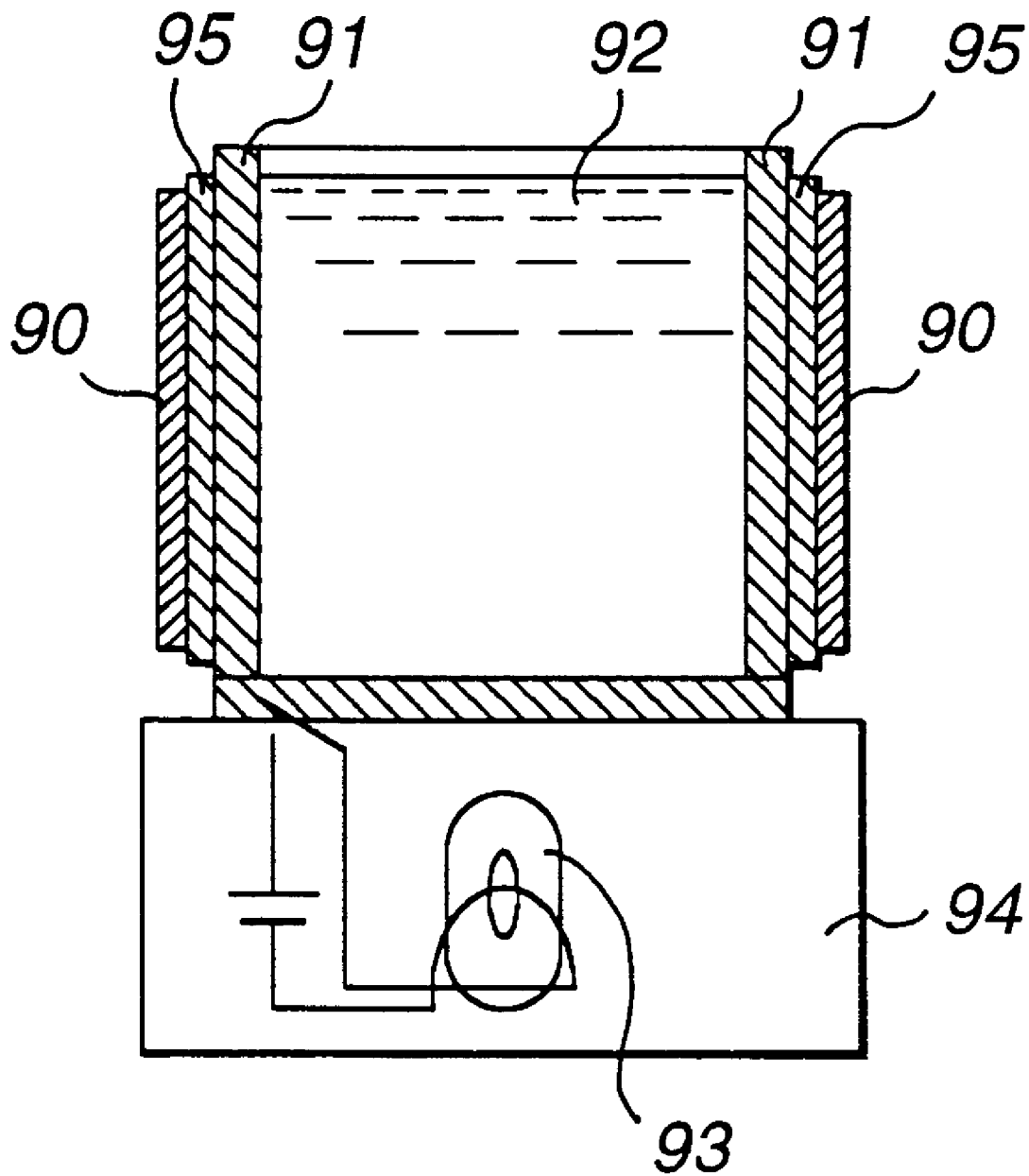
FIG. 23 is a schematic view showing yet another illustrative structure of an image reproducing device according to the present invention.

Similar effects may be obtained using the above-mentioned louver film. That is, if a louver film 95 is arranged between the light-introducing block 91 and the holographic stereogram 90 as shown in FIG. 23, it becomes similarly possible to improve the contrast or to prevent reproduction of the backward side unneeded image portion.

Although the monochromatic holographic stereogram has been explained in the foregoing, the present invention can similarly be applied to a colored holographic stereogram. In preparing the colored holographic stereogram, three light beams corresponding to three prime colors are used as recording light. For reproducing the colored holographic stereogram recorded using three light beams corresponding to three prime colors, three light sources radiating three prime colors are provided in an image reproducing device, and light beams from the respective light sources are simultaneously illuminated on the holographic stereogram as the reproducing illuminating light. It should be noted that, if these plural light sources are used, the optical system needs to be designed so that the light beams from the three light source will be parallel to one another. For reproducing the colored holographic stereogram, light source of high color purity are preferably used as respective light source in view of the weak wavelength selectivity in transmission type reproduction. This makes possible clear reproduction of the colored holographic stereogram even with the transmission type.

In the above description, the holographic stereogram is stuck to the light-introducing block via an index matching liquid. However, it is only sufficient if the holographic stereogram is optically contracted with the light-introducing block such that there is no necessity of using an index matching liquid. That is, if the device is of the air-proofed structure, the holographic stereogram may be directly contacted with the light-introducing block. Alternatively, holographic stereogram may be stuck to the light-introducing block using an adhesive or a double-sided adhesive tape, if the refractive index of the adhesive or the adhesive tape is close to that of the holographic stereogram.

What is claimed is:

1. An image reproducing method for reproducing an image from a holographic stereogram of an edge-lit system, comprising:

arranging a holographic stereogram on a curved surface of a light-introducing block;

directing a reproducing illuminating light beam on the holographic stereogram via the light-introducing block; and reproducing an image with a diffracted light beam that is produced when the reproducing illuminating light beam is transmitted through the holographic stereogram.

2. The image reproducing method as claimed in claim 1 wherein a substantially columnar- or cylindrically-shaped light-introducing block is used as said light-introducing block.

3. The image reproducing method as claimed in claim 1 wherein a light-transmitting vessel is used as said light-introducing block; and wherein for illuminating a reproducing illuminating light beam to said holographic stereogram, a liquid is charged into said vessel and the reproducing illuminating light beam is illuminated to the holographic stereogram via said vessel and the liquid.

4. An image reproducing apparatus for reproducing an image from a holographic stereogram of an edge-lit system, comprising:

a light-introducing block having a curved surface on which a holographic stereogram is arranged;

wherein a reproducing illuminating light beam is illuminated via said light-introducing block to the holographic stereogram arranged on said curved surface of said light-introducing block so that an image is reproduced by the reproducing illuminating light beam being transmitted through and diffracted by the holographic stereogram.

5. The image reproducing apparatus as claimed in claim 4, wherein an optical filter that transmits the reproducing illuminating light beam but does not transmit the light perpendicular to a surface of the optical filter is arranged between the light-introducing block and the holographic stereogram.

6. The image reproducing apparatus as claimed in claim 4 wherein an opaque member is arranged in the interior of said light-introducing block in register with a reproduced image.

7. The image reproducing apparatus as claimed in claim 4 wherein said light-introducing block is substantially cylindrically-shaped and has an inner hollow portion.

8. The image reproducing apparatus as claimed in claim 7 wherein an opaque member is arranged in the hollow portion of said light-introducing block.

9. The image reproducing apparatus as claimed in claim 7, wherein at least a portion of a member necessary for producing the reproducing illuminating light beam is arranged in the hollow portion of said light-introducing block.

10. The image reproducing apparatus as claimed in claim 4 wherein the light-introducing block is a vessel charged with a liquid, and wherein a reproducing illuminating light beam is illuminated on the holographic stereogram via the light-introducing block and the liquid charged into the light-introducing block.

11. The image reproducing apparatus as claimed in claim 10 wherein an optical filter transmitting the reproducing illuminating light beam but not transmitting the light perpendicular to the surface is arranged between the light-introducing block and the holographic stereogram.

12. The image reproducing apparatus as claimed in claim 10 wherein the portion of the light-introducing block in register with the reproduced image is of a liquid-tight structure and wherein an opaque member is arranged at a portion of the light-introducing block in register with the reproduced image.

13. The image reproducing apparatus as claimed in claim 4 further comprising:

a light source for illuminating the reproducing illuminating light beam to the holographic stereogram via said light-introducing block.

14. The image reproducing apparatus as claimed in claim 13 further comprising:

an optical component for routing the reproducing illuminating light beam from the light source to said light-introducing block.

15. The image reproducing apparatus as claimed in claim 13 further comprising:

a support block on which to set said light-introducing block; wherein said light source is enclosed in said support block.

16. The image reproducing apparatus as claimed in claim 15 wherein said light-introducing block and the support block are designed so that said light-introducing block is accommodated in a pre-set portion when the light-introducing block is set on the support block.

17. The image reproducing apparatus as claimed in claim 15 wherein said support block includes sensor means for detecting the setting of the light-introducing block thereon;

said light source emitting light only when the setting of the light-introducing block on the support block is detected by said sensor means.

* * * * *